United States Patent
Luo et al.

(10) Patent No.: US 7,474,345 B2
(45) Date of Patent: Jan. 6, 2009

(54) SYSTEM AND METHOD TO FACILITATE TIME DOMAIN SAMPLING FOR SOLID STATE IMAGER

(75) Inventors: Qiang Luo, Gainesville, FL (US); Zhiliang Julian Chen, Plano, TX (US); John G. Harris, Gainesville, FL (US); Steve Clynes, Allen, TX (US); Michael Erwin, Marlborough, MA (US)

(73) Assignee: Texas Instruments Incorporated, Dallas, TX (US)

( * ) Notice: Subject to any disclaimer, the term of this patent is extended or adjusted under 35 U.S.C. 154(b) by 1473 days.

(21) Appl. No.: 10/217,581

(22) Filed: Aug. 12, 2002

(65) Prior Publication Data

US 2003/0076432 A1 Apr. 24, 2003

Related U.S. Application Data

(60) Provisional application No. 60/335,202, filed on Oct. 24, 2001.

(51) Int. Cl.
*H04N 3/14* (2006.01)
*H04N 5/335* (2006.01)

(52) U.S. Cl. .................................. 348/297; 348/302
(58) Field of Classification Search ................ 348/294, 348/297, 308, 362, 296, 302, 231.3; 341/165, 341/169, 155, 161
See application file for complete search history.

(56) References Cited

U.S. PATENT DOCUMENTS

| | | | |
|---|---|---|---|
| 6,248,991 B1 | 6/2001 | Chen et al. | |
| 6,271,785 B1 | 8/2001 | Martin et al. | |
| 6,320,616 B1 | 11/2001 | Sauer | |
| 6,323,942 B1 | 11/2001 | Bamji | |
| 6,529,240 B2 * | 3/2003 | Tan et al. | 348/302 |
| 6,545,624 B2 * | 4/2003 | Lee et al. | 341/155 |
| 6,549,239 B1 * | 4/2003 | Tao | 348/371 |
| 6,552,745 B1 * | 4/2003 | Perner | 348/308 |
| 2002/0113887 A1 * | 8/2002 | Iimura et al. | 348/310 |

OTHER PUBLICATIONS

Kummaraguntla, Ravi Kishore; Time Domain Quantization CMOS Image Sensor System Design and Architecture; 2001; pp. 24-44.
Lisa G. McIlrath. *A Low-Power Low-Noise Ultrawide-Dynamic-Range CMOS Imager with Pixel-Parallel A/D Conversion.* IEEE Journal of Solid State Circuits, vol. 36, No. 5, 2001, pp. 846-853.
R. Kishore K., *Time Domain Quantization CMOS Image Sensor System Design and Architecture*, Master Thesis of University of Florida, 2001.

(Continued)

*Primary Examiner*—Lin Ye
*Assistant Examiner*—Nelson D Hernández Hernández
(74) *Attorney, Agent, or Firm*—Steven A. Shaw; W. James Brady; Frederick J. Telecky, Jr.

(57) ABSTRACT

A time domain sampling technique for a CMOS imager enables a wide dynamic range and flexibility by employing up to two-degrees of freedom during such sampling. Two degrees of freedom can be achieved by making one or both of an integration time and a reference (e.g., voltage or current) variable during sampling. The sampling (or image capture) is implemented by associating a time with when a pixel has a desired value relative to the reference in response to the pixel receiving incident light. The reference can be fixed or variable during different portions of the sampling, and further can be programmable to implement a desired sampling pattern for a given application.

18 Claims, 9 Drawing Sheets

OTHER PUBLICATIONS

Ruffin VanRullen, Simon J. Thorpe. *Rate Coding Versus Temporal Order Coding: What The Retinal Ganglion Cells Tell The Visual Cortex*. Neural Computation 13, 2001, pp. 1255-1283.

R.C. Gonzalez, R.E. Woods, *Digital Image Processing*, Addison-Wesley Publishing Company, 1992, pp. 340-363.

A. Roychaudhuri, et al., "*Substrate Bias Dependence of Short-Channel MOSFET Threshold Voltage—A Novel Approach*", IEEE Trans. Electron Devices, vol. 35, No. 2, pp. 167-173, Feb. 1988.

C.J.B. Fayomi, G.W. Roberts and M. Sawan, *Low Power/Low Voltage High Speed CMOS Differential Track and Latch Comparator with Rail-to-Rail Input*, ISCAS 2000, pp. 653-656, May 28, 2000, Geneva, Switzerland.

Paul Debevec, *Light Probe Image Gallery*, Proceedings of SIGGRAPH 98 (Jul. 1998, Orlando, Florida), www.debevec.org/Probes/.

Gregory Ward Larson *Overcoming Gamut and Dynamic Range Limitations in Digital Images, SIGGRAPH 2001, Silicon Grapics, Inc.*

Spros Kavadias, Bart Dierickx, Danny Scheffer, etc. *A Logarithmic Response CMOS Image Sensor with On-Chip Calibration*. IEEE Journal of Solid State Circuits, vol. 35, No. 8, 2000, pp. 1146-1152.

Steven Decker, R. Daniel McGrath, Kevin Brehmer, etc. *A 256×256 CMOS Imaging Array with Wide Dynamic Range Pixels and Column-Parallel Digital Output*. IEEE Journal of Solid State Circiuts, vol. 33, No. 12, 1998, pp. 2081-2090.

David X.D. Yang, Abbas El Gamal, Body Powler, etc. *A 640×512 CMOS Image Sensor with Ultrawide Dynamic Range Floating-Point Pixel-Level ADC*. IEEE Journal of Solid State Circuits, vol. 34, No. 12, 1999, pp. 1821-1834.

Woodward Yang. *A Wide-Dynamic-Range Low-Power Photosensor Array*. ISSCC94, pp. 230-231.

Eugenio Culurciello, Ralph Etienne-Cummings, Kwabena Boahen. *Arbitrated Address Event Representation Digital Image Sensor*. ISSCC 2001, pp. 92-93.

\* cited by examiner

SYSTEM AND METHOD TO FACILITATE TIME DOMAIN SAMPLING FOR SOLID STATE IMAGER

CROSS REFERENCE TO RELATED APPLICATION

The present application claims the benefit of U.S. Provisional Patent Application Serial No. 60/335,202, filed Oct. 24, 2001, entitled TWO-DEGREE OF FREEDOM TIME DOMAIN SAMPLING TECHNIQUE FOR CMOS IMAGER, and which is incorporated herein by reference.

TECHNICAL FIELD

The present invention relates to imaging and more particularly to a system and method to facilitate time domain sampling for a solid state imager.

BACKGROUND OF INVENTION

Imaging systems are employed in a variety of applications, such as medical devices, satellite as well as microscope and telescope apparatuses. More recently, imaging systems have been utilized in a variety of additional applications such as digital cameras, computer scanners and digital camcorders. A majority of these applications utilize charge-coupled-devices (CCDs) as the underlying image sensors. However, CCD-based image sensors are limited or impractical for use in many consumer applications.

For example, CCDs typically are manufactured using four to six inch wafer fabrication lines, whereas many fabrication processes employ twelve to fourteen inch lines. CCDs thus cannot be fabricated employing conventional Complimentary-Symmetry Metal-Oxide Semiconductor (CMOS) fabrication processes. The mismatch in processing technology for CCDs also precludes the integration of additional on-chip functionality beyond light sensing and charge to voltage conversion for CCDs. As a result, CCDs usually employ independent support chips to perform, for example, CCD control, A/D conversion, and signal processing, such as implemented with CMOS integrated circuits (ICs).

The operation of CCD imagers also requires multiple high supply voltages (e.g., 5V-12V) resulting in higher power consumption than CMOS imagers. As a result, the costs for the CCD image sensor and the system employing the sensor remain high. Additionally, since the current to charge the CCDs is high, CCDs are not well suited for portable devices.

CMOS imagers have offered improvements in functionality, power and cost in many applications (e.g., digital video, digital cameras). A CMOS type image sensor includes a photodiode or phototransistor employed as a light detecting element. These sensors use active pixels, hence their alternate name Active Pixel Sensors (APS). Each pixel has an amplifier that converts the collected charge packet to a voltage. The output of the light detecting element is an analog signal whose magnitude is approximately proportional to the amount of light received by the elements. The magnitude of the analog signal can be measured for each photo diode representing a pixel and stored to provide an entire stored image. CMOS imagers utilize less power, have lower fabrications costs and offer high system integration compared to imagers made with CCD processes. Additionally, CMOS imagers have the advantage that they can be manufactured using similar processes employed to those commonly used to manufacture logic transistors, such that the necessary CMOS imager support functions can be fabricated on the same chip.

The potential to achieve wide dynamic range imaging of CMOS image sensors have also attracted attention in the field of electronic imaging that was previously dominated by CCDs. Dynamic range is the ratio between the brightest and darkest recordable parts of an image or scene. Several techniques have been utilized in an effort to improve the dynamic range of conventional CMOS imagers that implement voltage domain sampling. Some of these methods include logarithmic response CMOS imagers, multiple frame capture techniques, and floating-point pixel-level ADC imagers. Logarithmic response CMOS imagers incorporate logarithm compression at the photodiode level to achieve wide dynamic range. The logarithmic response technique suffers from the problem of fixed pattern noise due to the device mismatches, and poor sensitivity and local contrast. Multiple frame capture techniques implement a lateral overflow gate to increase pixel dynamic range. This technique suffers from mismatch in the lateral overflow transistor gate-drain overlap capacitance. Also it requires capturing multiple frames and complex reconstruction processing. Furthermore, its logarithmic compression curve strongly reduces image contrast. Floating-point pixel-level ADC imagers require large memory to store the data and require a complex reconstruction process.

Recently, some researchers have started to explore time domain sampling techniques in order to overcome the inherent limitations of conventional CMOS imagers operating in the voltage domain. Voltage-to-frequency conversion photosensors provide a high dynamic range. However, the readout process of the photosensor array generally takes a very long time. Thus, this technique is not applicable for many implementations. In another approach, an arbitrated address event representation digital image sensor technique utilizes row and column arbiters to send out the pixels according to the firing order. This technique requires a high-resolution timer and a large frame buffer. Pixel-parallel analog-to-digital (A/D) conversion CMOS imagers implement a free-running photocurrent-controlled oscillator to give a first-order $\Sigma$-$\Delta$ sequence. This technique requires a constant reference voltage and the imaging procedure requires a full second of time. A time domain quantization sensing (TDQS) technique uses the idea of digitizing a sensing pixel analog value by quantizing it in the time domain. A scene is sampled multiple times in the TDQS system and a large memory is needed to store the data. Also, since a pixel is read off-chip multiple times, the power consumption of the system can be substantial.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a sampling technique that can be used to facilitate image capture and reconstruction in a CMOS imaging system. The approach provides two possible degrees of freedom associated with image sampling, which can be selected to enable a wide dynamic range and reasonable resolution. In a CMOS imaging system that includes an array of photodiodes, the two degrees of freedom can include the integration time and a reference having an electrical characteristics (e.g., voltage or current) that is compared relative to a corresponding electrical characteristic of the photodiodes in response to receiving light. A time value is associated with the photodiodes based on the comparison, which time value is indicative of the intensity of the light received by the respective photodiodes.

Another aspect of the present invention provides for employing a non-uniform reference as a function of time over a given sampling interval. The reference voltage can be defined as distinct functional forms for different light intensity ranges. For example, in a system that includes photodiodes having voltages that decrease in response to incident light, it may be desirable to employ a functional form of reference voltage that first decreases and then increases as a function of time for a high intensity light range. In a middle light intensity range the reference can be fixed or increase. The reference can then be controlled to increase more slowly for a low light intensity range, which generally occurs near the end of the sampling period.

In accordance with a particular aspect of the present invention, application-dependent, three-dimensional parameters, such as photocurrent, integration time, and reference voltage, can be derived according to a search method to facilitate image capture so as to provide a wide dynamic range and reasonable resolution imaging. One or more of such parameters can be programmable for a given application. The proposed imaging technique thus provides controllable and flexible sampling patterns.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates generally to a time domain sampling technique for a CMOS imager. The present approach enables a wide dynamic range and flexibility due to employing two-degrees of freedom during such sampling. Two degrees of freedom can be achieved by making one or both of an integration time and a reference (e.g., voltage or current) variable during sampling. The time domain sampling with the CMOS image sensor is implemented by storing a time associated with when a pixel has a desired value relative to a reference in response to the pixel receiving incident light. The reference can be fixed or variable over time, and further can be programmable to implement a desired sampling pattern for a given application.

Figure 1:
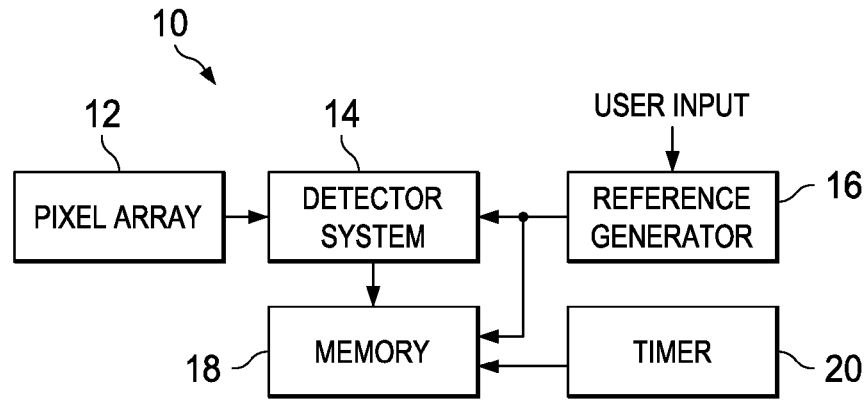
FIG. 1 illustrates an example of a block diagram of an imaging system in accordance with an aspect of the present invention.

FIG. 1 illustrates an imaging system 10 to facilitate sampling in the time domain in accordance with the aspect of the present invention. The system 10 includes a pixel array 12 having a plurality of pixels, such as arranged in the plurality of rows and columns. For example, the pixel array 12 includes a plurality of CMOS pixel sensors arranged in rows and columns and spaced apart from each other according to a fill factor. It is to be understood and appreciated that the pixel array 12 can be implemented in a variety of array sizes (e.g., 16×16, 128×128, 256×256, etc.). A pixel sensor includes photodiodes, which can be of a type that discharge in response to incident light or the type that charges in response to incident light. In either case, the photodiodes provide an electrical characteristic (e.g., voltage or current) indicative of the intensity of the incident light.

A detector system 14 is operatively associated with the pixel array 12 for detecting electrical characteristics of at least some of the photodiodes in the array indicative of the brightness or illumination intensity for the pixels. A reference generator 16 provides a reference signal to the detector system 14. The reference, for example, is a voltage or a current reference that the detector system 14 compares relative to the detected electrical characteristic (e.g., voltage or current) of the respective pixels to ascertain the firing state of the pixels.

By way of example, the detector system compares the voltage of a respective photodiodes in the pixel array 12 with a reference voltage provided by the reference generator 16. Once a photodiode voltage drops below the reference voltage the detector system 14 provides a digital logic output indicative of a status change for the pixel. The digital status change is provided to an associated memory system 18 that is operative to store a time value, such as a time index that indicates when a respective pixel has experienced a state change relative to the reference voltage. Thus, the timer 20 provides a timer signal to the memory system, which can be stored in connection with pixel position information and the associated reference voltage. The detected status change time instance and the reference voltage can be utilized to reconstruct the image for each of the pixels. It is to be appreciated that the timer 20 can be programmed or controlled to reset periodically to enable image data to be collected for each of a plurality of consecutive frames, such as for full motion video imaging applications. The timer 20 is controlled to provide an associated integration time that defines sampling times. The integration time can be programmable, such as in response to a user input according to a given application.

In accordance with the aspect of the present invention the reference generator 16 can be programmable, such as in response to a user input. A programmable reference generator 16 enables different sampling patterns to be utilized and, in turn, achieve different dynamic ranges based on changes in the reference provided by the generator. The reference generator 16 further can implement changes in its reference based on the timing signal from the timer 20.

The imaging system 10 enables a wide dynamic range to be achieved because the total dynamic range for the system is an aggregate of the dynamic range of the integration time and the dynamic range associated with the reference voltage from the reference generator 16. The added flexibility by having such two-degrees of freedom will become apparent based upon the description herein. This is to be contrasted with the traditional approach in which CMOS Imaging samples in the voltage domain.

Figure 2:
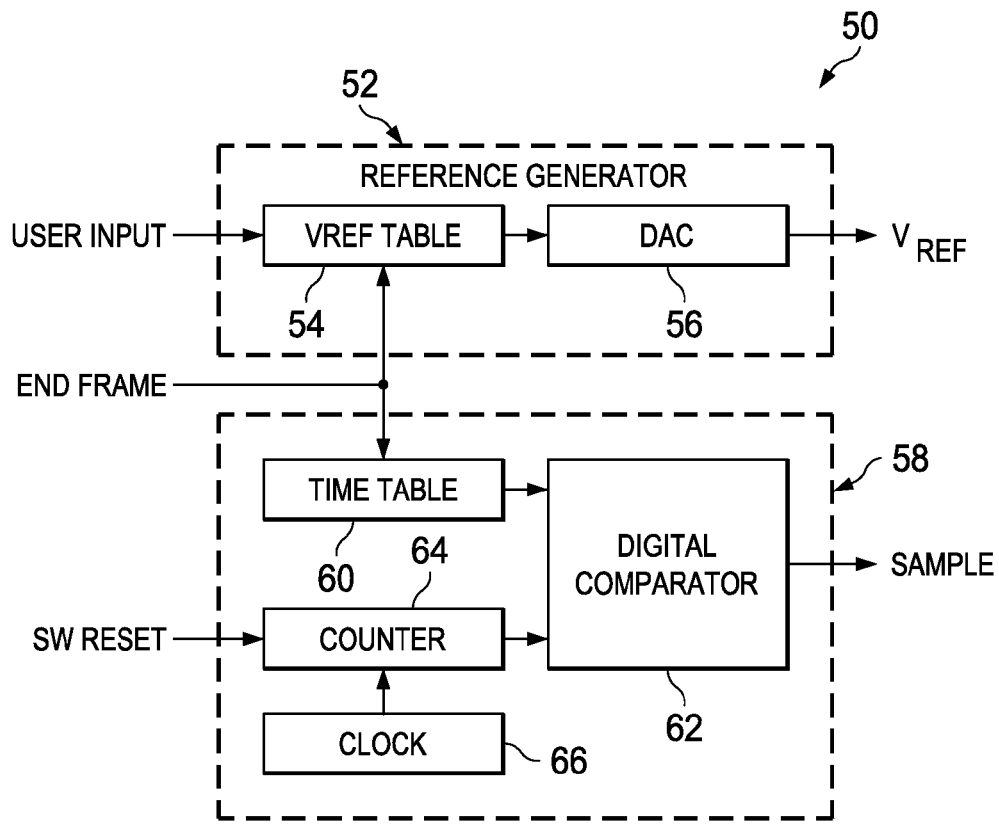
FIG. 2 illustrates an example of a system for generating a reference signal and a sample signal in accordance with an aspect of the present invention.

FIG. 2 illustrates an example of a system 50 that can be utilized to generate a reference signal and a sample signal in accordance with an aspect of the present invention. The system 50 includes a reference generator 52 that is programmed and/or configured to generate a reference voltage that can vary as a function of time during sampling. As noted above, by varying the reference voltage as a function of time, non-uniform sampling can be implemented to improve resolution. The reference generator 52 includes a $V_{REF}$ table that provides a digital indication of the reference voltage to a digital-to-analog converter (DAC). The table 54 includes a plurality of reference values, such as can be indexed by time, such as indicated by a end frame signal, to provide a desired reference voltage as a function of time during a sampling process.

The digital inputs (e.g., the reference table values) to the DAC 56 can be stored in an off chip memory on chip shift registers. The DAC 56 converts the digital reference signal to a corresponding analog voltage reference for comparison relative to a photodiodes voltage. An end frame signal controls the rate processing of the reference table 54. For example, the end frame signal can be a binary signal indicative of a scanning state in which "0" indicates that the raster scan is in process and "1" indicates that the raster scan is finished or the current frame has been sampled and the new sampling can begin. Thus, the end frame signal causes the next reference voltage to be provided by the table 54.

It is to be understood and appreciated that plurality of users is selectable reference table could be utilized, which may be selected by a user input. In accordance with a particular aspect, the reference table can vary $V_{REF}$ as a function of the integration time.

The system 50 also includes a sample signal generator 58. The sample signal generator 58 includes a time table 60 that also receives the end frame signal. The time table 60, which can be an off chip memory or a shift registers, provides a time data index by the end frame signal. The time data is provided to a digital comparator 62. The digital comparator 62 also is operative to receive a counter signal from a counter 64. The counter 64 generates a counter signal that determines a sampling time instance. A counter 64 generates the counter signal based on a software (SW) reset signal and a clock signal from a clock 66. The digital comparator 62 compares the output of the counter 64 with the output of the time table 60. The SW reset signal resets the counter at the beginning of the image capture.

It is to be appreciated that the use of shift registers for the $V_{REF}$ and time tables enables timing control to be simplified, although it generally requires more overhead (e.g., transistors) to store one bit. It is further to be appreciated that off-chip memory, could be utilized to implement the tables 54 and 60. However, off-chip memory usually requires more complicated control and addressing schemes, although fewer transistors to store one bit. The sample signal is utilized (e.g., by a readout device) to latch the bit frame of an associated imaging system.

Figure 3:
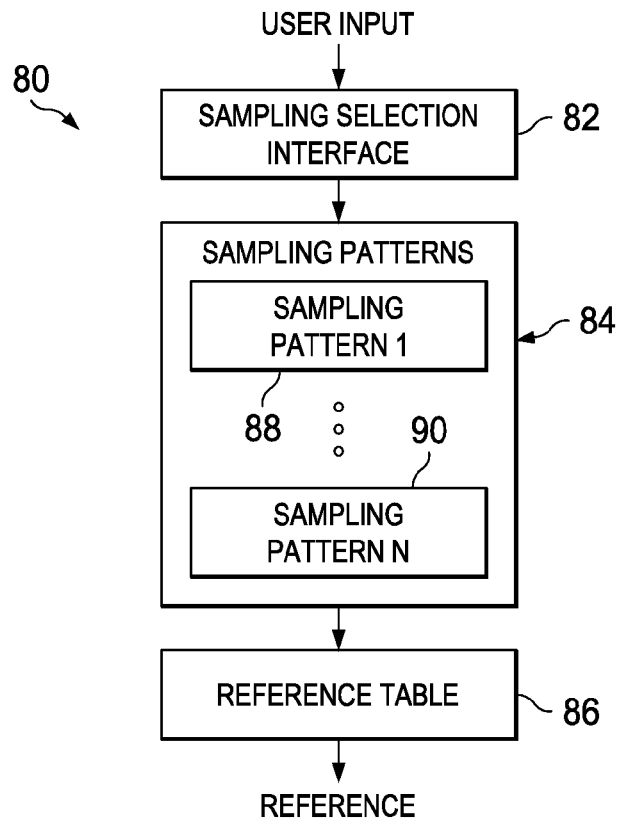
FIG. 3 illustrates an example of a system for generating a reference signal in accordance with an aspect of the present invention.

FIG. 3 depicts an alternative reference generator 80 that can be utilized to generate a reference signal in accordance with an aspect of the present invention. The reference generator 80 includes a sampling pattern selection interface 82 that is programmed and/or configured to select one or more sampling patterns for use in image capture according to the aspect of present invention. In particular, the sampling interface 82 receives a user input, such as entered via an input device (e.g., a keypad, dial, on screen display, and so forth) of an associated imaging system and selects sampling characteristics to define a sampling pattern from the pattern data store 84. The user input, for example, can specify a desired integration time or other parameter associated with an imaging application. Alternatively, the integration time can be predefined for different user-defined imaging applications. The user input further can include information about the will-be-captured environment (e.g., brightness or darkness levels, indoor or outdoor, etc.) or information about desired imaging characteristics (e.g., in which light intensity ranges more dynamic range is desired or special effects to be implemented).

The selected sampling characteristics are utilized to populate the reference table 86 to define a sampling pattern. The reference table 86, which can be indexed by an end frame signal, provides a digital reference value to a DAC from which a corresponding analog reference signal can be generated. It is to be understood and appreciated that the sampling pattern data that populates the reference table 86 can be an aggregation of different sampling pattern data. For example, the sampling pattern data store 84 can include a plurality of sampling patterns 88 and 90. The data can be stored as predefined curves or data tables, equations that define functional forms or other data operative to define reference characteristics (e.g., voltages) as a function of time. In one example, the reference data can be stored in time-based increments of sampling pattern data, such as providing a variable dynamic range for different intensities of light based on the user input.

By way of further example, one block of the sampling pattern data 88 can be associated with a first part of a sampling time period, such as to enable programming a desired dynamic range for the first time period of the total sampling time period. As noted above, a first part of the sampling time period generally corresponds to high intensity or bright light since light is generally sampled in order or its intensity. Another set of sampling pattern data 90 might correspond to a second portion of the sampling time period, such as is associated with a different range of light intensity (e.g., medium or low intensity light).

Thus, those skilled in the art will understand and appreciate that any number of such sampling pattern sets (or blocks) can be utilized and aggregated together (e.g., by the reference generator in response to user inputs) to define a composite sampling pattern to capture an image. It is further to be understood and appreciated that the sampling pattern data for each of the sets can correspond to linear or nonlinear curves or other functional representations of $V_{REF}$ over time in order to achieve a desired dynamic range when implementing a time domain imaging system in accordance with an aspect of the present invention. In addition, while the sampling pattern data store 84 is illustrated as containing preprogrammed sampling patterns, those skilled in the art will understand appreciate that sampling patterns can be user-programmable and further can be generated on the fly by employing suitable sampling pattern algorithms in response to the user inputs. Thus, it is to be appreciated that the system provides a flexible approach that can implement any number or type of sampling patterns.

Figure 4:
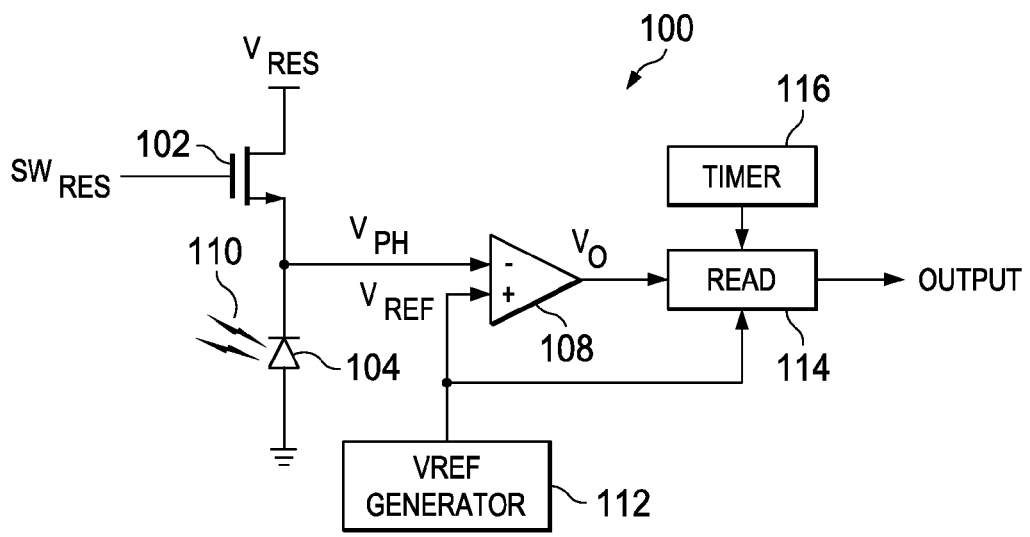
FIG. 4 illustrates an example of a schematic block diagram of a digital pixel sensor circuit in accordance with an aspect of the present invention.

FIG. 4 illustrates a digital pixel sensor circuit 100 in accordance with an aspect of the present invention. The digital pixel sensor circuit 100, which defines a CMOS pixel sensor, is employed in a time domain sampling system. The circuit 100 includes a reset transistor 102 coupled to a photodiode 104, which has a capacitance. The photodiode 104 is coupled to a negative terminal of a comparator 108.

A software reset signal ($SW_{RES}$) activates the reset transistor 102 to provide a voltage reset signal ($V_{RES}$) to the photodiode 104. The voltage reset signal ($V_{RES}$) provides a starting photodiode voltage $V_{PH}$ to the photodiode 104. The starting photodiode voltage can be a maximum or minimum voltage depending on the type of photodiode being utilized. The software reset signal ($SW_{RES}$) then changes state opening the reset transistor 102, such as intermittently or periodically according to a sampling cycle time, as defined by an associated integration time. Incident light 110 causes the photodiode 104 to discharge, thereby decreasing the photodiode voltage $V_{PH}$ provided to the comparator 108. The rate at which the photodiode voltage $V_{PH}$ decreases is proportional to the intensity or brightness of the incident light received by the photodiode 104. It is to be understood and appreciated that, alternatively, a different type Of photodiode could be employed so as to charge and result in a corresponding increase in the photodiode voltage $V_{PH}$.

A reference generator 112 supplies a reference voltage $V_{REF}$ to the positive terminal of the comparator 108 in accordance with an aspect of the present invention. The reference generator 112 can provide $V_{REF}$ as a fixed voltage or a variable reference, which may be varied non-uniformly or uniformly over a sampling time. When the $V_{PH}$ drops to or below the value of reference voltage $V_{REF}$, such as in response to receiving the incident light 110, the output $V_O$ of the comparator 108 will toggle or change states (e.g., from a logic low to a logic high). Therefore, the brighter the incident light that the photodiode 104 receives, the faster the comparator 108 will toggle. It further is to be appreciated that changes in the reference voltage $V_{REF}$ also can adjust how quickly (if at all) the comparator 108 will toggle for a given intensity of light. Thus, because the integration time and $V_{REF}$ both can be variables, an imaging system implementing such circuitry 100 provides two degrees of freedom. As a result, a desired wide dynamic range can be achieved in accordance with an aspect of the present invention.

The comparator output $V_O$ is provided to activate or trigger a read device (e.g., a memory device such as a latch) 114. The read device 114 is coupled to read a timer or count value from an associated timer component 116. For example, the timer or count value can be implemented as a time index value that, in response to $V_O$, corresponds to the time that the photodiode voltage has a voltage relative to $V_{REF}$ sufficient to cause the comparator to toggle to a fired state (e.g., corresponding to capturing a pixel portion of an image). The time index value read when the comparator toggles corresponds to the brightness (or intensity) of the incident light 110 received by the photodiode 104 further based on the value of $V_{REF}$ when the comparator 108 toggles. Those skilled in the art will understand and appreciate various different ways in with an indication of time can be associated with the firing of photodiodes or other pixel sensors in accordance with an aspect of the present invention.

The read device 114 provides an output signal, such as that indicates pixel location for the photodiode 104 and the relative toggle time of the comparator 108. Additionally, the output signal can include an indication of the value of $V_{REF}$ at the toggle time or $V_{REF}$ can be associated with time in another a memory device. Those skilled in the art will appreciate various ways to obtain timer and $V_{REF}$ values for the each of the pixels so as to enable image reconstruction for the respective pixels.

From the perspective of a CMOS imager that includes a plurality of CMOS pixel sensors, such as depicted in FIG. 4, an output signal is generated for each of the pixels firing in the CMOS sensor. The respective output signals, which include an indication of the time associated with the firing of the CMOS pixel sensors, can be stored and employed in reconstruction of the image. The output signals thus facilitates image reconstruction because, as described herein, the intensity of incident light (or photocurrent) for each pixel can be determined from a given time value and $V_{REF}$ value for respective pixel locations. Alternatively or additionally, the output signals can represent the sampling order (index) that are sent out at each sampling time instance as well as the positions of the pixels that fired at this sampling time instance.

It will be appreciated that the timer 116, the read device 114 or both can be implemented as part of the same or a different integrated circuit that includes photodiodes and comparators of the CMOS imaging system. It is further to be appreciated that to reduce overhead the output of the comparator 108 can be selectively coupled to the read device 114, such as through row and/or column selection circuitry (not shown). For example, a row-select signal can selectively connect the comparator output $V_O$ to a column bus, such as based on which part of the pixel array is presently being read. The comparator output $V_O$ further can correspond to a write enable line, which can be associated with a memory array. The write enable line controls writing when an indication of toggle time (e.g., firing time of CMOS pixel sensor) is written to a memory location, such as can be associated with the pixel location. While a plurality of pixels and comparators are utilized to form an image sensing system (usually on a single chip), one timer could be used to generate desired timing signals for all such pixels. Further to facilitate operation of the sensor circuit, it may be desirable to disable the comparator after the comparator has toggled until the next sampling cycle begins.

As mentioned above, the reference generator 112 can control $V_{REF}$ for pixels in a CMOS imaging system to achieve wide dynamic range and reasonable resolution imaging in accordance with an aspect of the present invention. By way of example, if $V_{REF}$ is maintained too high, low intensity light (e.g., darkness) may not be sufficient to cause the comparator to toggle. In such cases, a maximum time value can be associated with such non-firing pixels to indicate the low intensity light. However, to help improve the dynamic range for low intensity light, the reference generator 112 can vary the reference voltage as a function of time during a sampling cycle. This helps enable the low-intensity incident light 110 to provide a photodiode voltage $V_{PH}$ that can trigger the comparator 108 to toggle during a sampling cycle. Additionally, to improve the dynamic range for high intensity light, the generator 112 can control $V_{REF}$ to change at different rates for different parts of the sampling cycle. Those skilled in the art will understand and appreciate that based on the teachings herein many types of sampling patterns can be created to help achieve a desired dynamic range and resolution for different imaging applications in accordance with an aspect of the present invention.

By way of background, it is known that the inverse of integration time (or integration frequency $f_{int}$) is a linear function of photocurrent, which can be expressed as:

$$f_{int} = \frac{1}{t_{int}} = \frac{I_{PH}}{C \cdot \Delta V} \qquad \text{Eq. 1}$$

where: $I_{PH}$=photocurrent;
C=capacitance of photodiode;
$\Delta V = V_{RES} - V_{REF}$.

A wide dynamic range of 120 dB image gives $I_{PH}$ the range of 120 dB. While the dynamic range of either the $f_{int}$ or the $\Delta V$ individually can reach so high a value, certain types of applications restrict the integration time. For video applications, for example, the integration time is less than about 33 ms and the minimum integration time $t_{int,min}$ is typically a few microseconds. Accordingly, the dynamic range of $t_{int}$ or $f_{int}$ will be limited to about 60 dB. The maximum value of $\Delta V$ is $V_{dd}$, and its minimum value is about a few millivolts or less generally due the offset limitation of comparator. Thus, the dynamic range of $\Delta V$ is also about 60 dB. While individually neither of the integration time and $\Delta V$ can represent the desired 120 dB, the integration time and the $\Delta V$ collectively enable such a dynamic range to be achieved according to an aspect of the present invention.

It can be shown that:

$$\lg I_{ph} = \lg C + \lg f_{int} + \lg \Delta V \qquad \text{Eq. 2}$$

where $\lg I_{ph}$ has a range of 0 to 120 dB,
$\lg f_{int}$ has a range of 0 to 60 dB,
$\lg \Delta V$ has a range of 0 to 60 dB, and
$\lg C$ is a constant.

From Eq. 2, it can be shown that only a change in integration time or only a change in $\Delta V$ cannot provide the required 120 dB dynamic range in equation. But if both of them are variable and contribute about 60 dB (or other amounts that aggregate to 120 dB), approximately 120 dB dynamic range imaging can be achieved, surpassing the conventional CMOS imager limit. Furthermore, as stated in Eq. 3, the ratio of two incident lights (e.g., received at different pixels) is the ratio of time-$\Delta V$ products.

$$\frac{I_2}{I_1} = \frac{f_{int2} \cdot \Delta V_2}{f_{int1} \cdot \Delta V_1} \qquad \text{Eq. 3}$$

It follows that if $I_{PH1}$ is $10^6$ times of $I_{PH2}$, then the term $f_{int1} \cdot \Delta V_1$ only needs to be $10^6$ times of the term $f_{int2} \cdot \Delta V_2$.

That is, as long as $\lg_{int} f + \lg \Delta V \geq 120$ dB, a wide dynamic range can be achieved according to an aspect of the present invention, without requiring both $f_{int}$ and $\Delta V$ have the dynamic range of about 60 dB. It thus is to be appreciated that the two freedoms provide more flexibility. Since the sampling is in the time domain instead of the voltage domain, as in most conventional CMOS systems, the present approach is named a time domain sampling system.

As mentioned above (see, e.g., FIGS. 1 and 4), in a time domain imaging system, incident light discharges the reset photodiode, and the voltage of photodiode $V_{PH}$ is compared with the reference voltage $V_{REF}$. Once $V_{PH}$ drops below $V_{REF}$, the digital output status for such pixel changes. The detected time instance of the status change and the reference voltage are used together to calculate the incident light intensity for a pixel, and further can be used for reconstructing the image. $V_{PH}$ is a linear function of integration time and can be expressed as follows:

$$V_{PH}(t) = V_{RES} - \frac{I_{PH} \cdot t}{C} \qquad \text{Eq. 4}$$

Eq. 4 reveals that changes $V_{REF}$ will not affect $V_{PH}$. Consequently, $V_{REF}$ is applied to all the pixels so that bright pixels always toggle the comparator before dark pixels. Thus, the sampling order is from bright pixels to dark pixels. In general, $V_{REF}$ is small for bright pixels and big for dark pixels. Thus, the change of $V_{REF}$ as a function of time is generally non-decreasing.

By way of further example, the following illustrates the idea of achieving wide dynamic range by employing two degrees of freedom using both integration time and reference voltage as variables. Assume for example, that the capacitance of photodiode is 5fF or C=5fF, $I_{ph,max}$=0.5 nA, and $I_{ph,min}$=0.5 fA. Also assume the maximum integration time is $t_{int,max}$=33 ms, and the minimum integration time is set to be $t_{int,min}$=10 μs. Assume $V_{REF}$ has the range of 2 mV to 2.5V, and $V_{RES}$=2.5V. Under these assumptions, to catch the brightest incident light, the minimum integration time can be expressed as:

$$t_{int,min} = \frac{C \cdot (V_{res} - V_{ref})}{I_{ph,max}} = 10 \ \mu s \qquad \text{Eq. 5}$$

Eq. 5 thus provides that $V_{REF}$=1.5V. Similarly, to catch $I_{PH,MIN}$, with appropriate substitutions in Eq. 5, $t_{int,max}$ gives $V_{REF}$=2.4967V, or about 3.3mV below the reset voltage. Thus, it will be appreciated that the whole 120 dB dynamic range of incident light intensity can be achieved in accordance with an aspect of the present invention. In this example, the integration time contributes about 70.4 dB dynamic range, and the reference voltage contributes about 49.6 dB dynamic range.

While the foregoing demonstrates that wide dynamic range can be achieved using time domain sampling according to an aspect of the present invention. Another aspect of the present invention relates to achieving a reasonable resolution for the time domain sampling. A reasonable resolution here indicates that the brightness step between two samples should not be too big. Resolution becomes more problematic in the high light intensity range because the photodiodes are discharged rapidly, whereas it is easier to achieve high resolution in low light intensity range due to their generally slow discharge characteristics.

Figure 5:
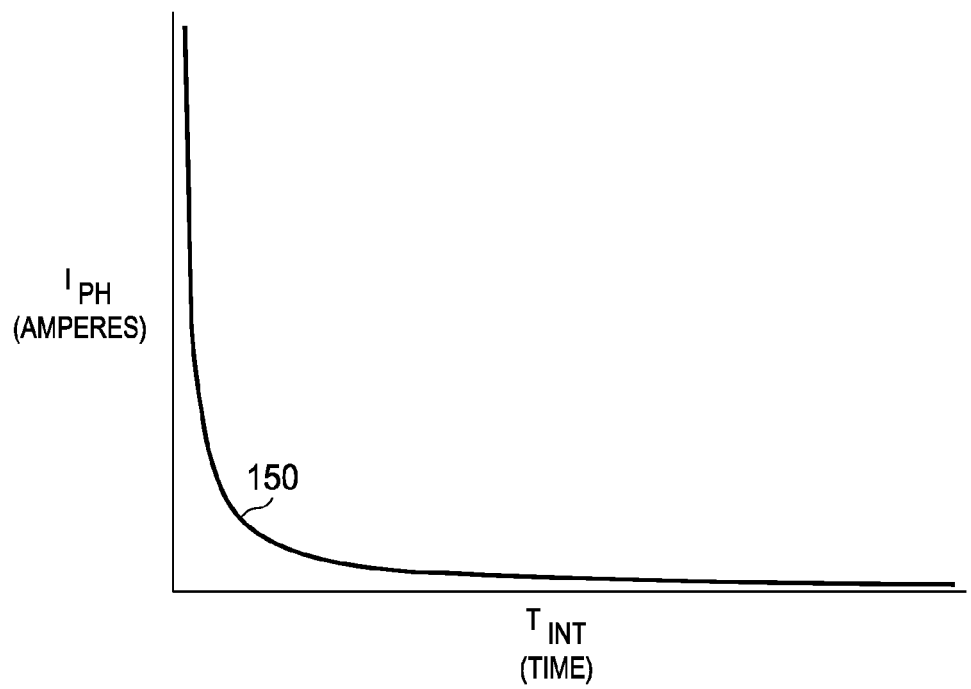
FIG. 5 depicts a graph of photocurrent versus integration time for a fixed reference.

For example, FIG. 5 illustrates a curve 150 representing the relationship between $I_{PH}$ and $t_{int}$ when $\Delta V$ is a constant (e.g., $V_{REF}$ remains uniform). A uniform sampling in time domain generally results in under-sampling in high light intensity range and over-sampling in low light intensity range. Therefore, a non-uniform sampling scheme can be utilized, in accordance with an aspect of the present invention, to provide appropriate levels of sampling over the entire intensity range according to the imaging application.

Figure 6:
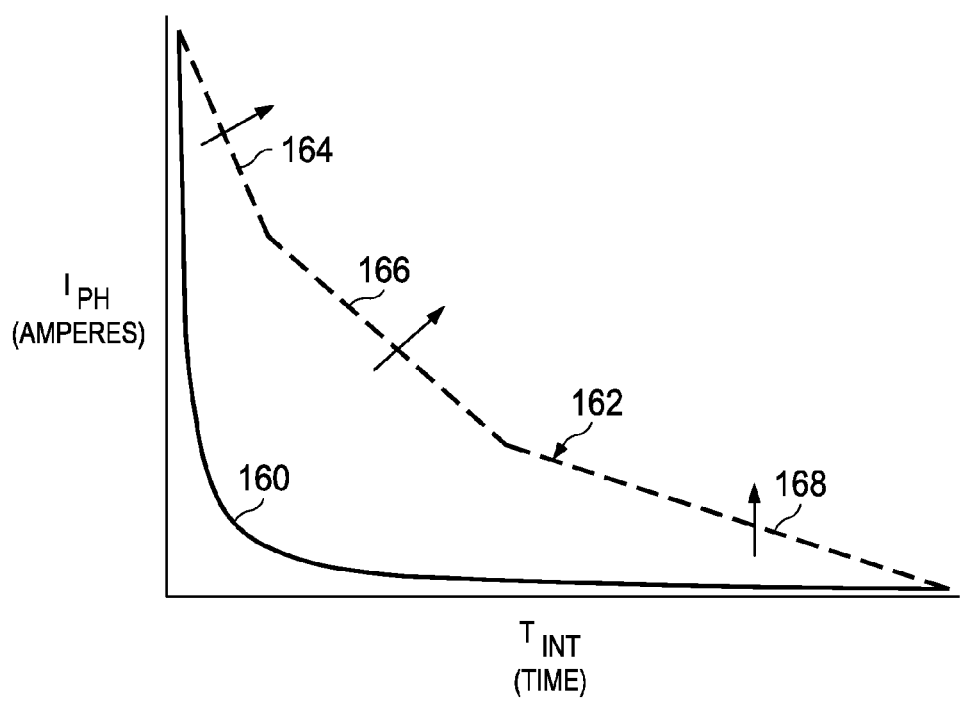
FIG. 6 depicts a graph of photocurrent versus integration time for a non-uniform reference in accordance with an aspect of the present invention.

FIG. 6 illustrates a curve 160 for uniform sampling, similar to the curve 150 of FIG. 5, and another curve 162 representing the relationship between $I_{PH}$ and $t_{int}$ for an example of non-uniform sampling (e.g., $V_{REF}$ is non-uniform over time). For example, to improve the resolution in high light intensity range, indicated at 164, the slope of the $I_{PH}$-$t_{int}$ curve 162 is reduced relative to that of curve 160. The slope of the curve 162 in a medium intensity range, indicated at 166, generally approximates a median slope of the curve 160. To avoid the over-sampling in low light intensity range, indicated at 168, the slope of the $I_{PH}$-$t_{int}$ curve 162 is increased from that of the curve 160. In order to implement the modifications in slope of the curve 162, the value of $\Delta V$ is changed accordingly, such as by modifying $V_{REF}$ based on $t_{int}$. As a result of employing the two-degrees of freedom (e.g., $t_{int}$ and $V_{REF}$—as in the term $\Delta V$), a reasonable resolution can be achieved to provide a wide dynamic range image in accordance with an aspect of the present invention. While the example shown in FIG. 6 depicts three generally piece-wise linear portions to form the curve 162, those skilled in the art will understand and appreciate that other functional forms (e.g., quadratic, linear, logarithmic, and so forth) and combinations of such functional forms can be combined to provide desired operating characteristics for such an imaging system.

In general, most display devices (e.g., CRT and LCD) have a luminance range of about 8 bits. Accordingly, it may not be necessary to represent all the $2^{20}$ digital resolution to achieve a 120 dB dynamic range image; although, $2^8$ digital numbers should be assigned to the wide dynamic range so that these $2^8$ points can cover the whole range. Thus, a reasonable distance between two sampled light intensities should be taken into account. There exist many different ways to sample the wide dynamic range incident light intensity to form the desired modified relation between $I_{PH}$ and $t_{int}$, such as shown in FIG. 6.

The following description analyzes factors that are related with the selection of resolution and how such factors influence the two freedoms according to an aspect of the present invention. Eq. 3 can be rewritten as:

$$\frac{I_{PH2}}{I_{PH1}} = \frac{t_{int1} \cdot \Delta V_2}{t_{int2} \cdot \Delta V_1} \quad \text{Eq. 6}$$

If $I_{PH2}=I_{PH1}-\Delta I_{PH}$ and $t_{int2}=t_{int1}+\Delta t_{int}$, the following Eq. 7 follows:

$$\Delta I_{PH} = I_{PH1} \cdot \left(1 - \frac{\Delta V_2}{\Delta V_1} \cdot \frac{1}{1 + \frac{\Delta t_{int}}{t_{int1}}}\right) \quad \text{Eq. 7}$$

It is to be appreciated that from a practical standpoint (e.g. due to limitations of imaging equipment), $\Delta t_{int}$ is limited by some minimum allowable sampling interval of the circuitry ($\Delta t_{int,min}$). Thus, to minimize the difference between two photocurrents, the ratio of $$\frac{\Delta V_2}{\Delta V_1}$$

should be maximized. If $\Delta I_{PH,min}$ is the minimum detectable photocurrent difference, then $$\left(\frac{\Delta V_2}{\Delta V_1}\right)_{max}$$

can be calculated. Those skilled in the art will further appreciate that $\Delta V$ has to be limited in its own dynamic range (e.g., a few millivolts to a few volts), and this inversely constrains the minimum detectable photocurrent difference.

For example, the maximum resolution that can be achieved in high light intensity range can be determined based on the $\Delta t_{int,min}$ and the dynamic range of reference voltage. In this high intensity range, where integration time $t_{int1}$ is small and has approximately the same order as $\Delta t_{int,min}$ (e.g., a few microseconds to a few tens of microseconds), the ratio of $$\frac{\Delta V_2}{\Delta V_1}$$

can be greater than 1 in order to achieve improved resolution. Therefore, in accordance with an aspect of the present invention, the reference voltage is no longer non-decreasing for a sensor employing a decreasing photodiode voltage. Instead the reference voltage initially increases the distance between the reference voltage and the photodiode voltage. This facilitates sampling of the ultra high intensity light during the portion of sampling when the reference voltage decreases. While in low light intensity range, since $t_{int1}$ is usually much greater than $\Delta t_{int,min}$, and $I_{ph1}$ is small, the ratio of $$\frac{\Delta V_2}{\Delta V_1}$$

typically will be no greater than about 1. That is, for low intensity light, the reference voltage usually is selected as a function of time that is non-decreasing. From Eq. 3, it follows that:

$$\left(\frac{\Delta V_2}{\Delta V_1}\right) = \left(1 - \frac{\Delta I_{ph}}{I_{ph1}}\right) \cdot \left(1 + \frac{\Delta t_{int}}{t_{int1}}\right) \quad \text{Eq. 8}$$

and furthermore that:

$$\left(\frac{\Delta V}{\Delta V_{\text{brightest\_pixel}}}\right) = \left(1 - \frac{\Delta I_{ph}}{I_{ph,\max}}\right) \cdot \left(1 + \frac{\Delta t_{int}}{t_{int,\min}}\right) \quad \text{Eq. 9}$$

So $\Delta V$ is a function of $\Delta I_{ph}$ and $\Delta t_{int}$, which functional relationship can be represented as a quadratic equation. The desired resolution of $\Delta I_{PH}$ and integration time provide the instruction on choosing reference voltage (e.g., the reference voltage can be selected as a function of the desired resolution and the integration time).

The following example demonstrates an approach that can be utilized to achieve a desired resolution by selecting an appropriate reference voltage. Assume, for sake of this example, 10 bits sampling are to be used to catch a 20 bits dynamic range image. As mentioned above, a non-linear change in $V_{REF}$ (e.g., a quadratic change or other curve that includes a decreasing portion) can be implemented to improve the resolution in the high intensity range instead of using a non-decreasing $V_{REF}$. By way of example, assume $C=5fF$, $I_{ph,\max}=0.5$ nA, and $t_{int,\min}=10$ μs, such that:

$$\Delta V = \frac{I_{ph,\max} \cdot t_{int,\min}}{C} = 1 \text{ V} \quad \text{Eq. 10}$$

Assume also that the minimum allowable sampling interval is 5 μs. If $\Delta V$ is kept as a constant of 1IV, TABLE 1 shows results that will be achieved from 10 to 50 μs.

TABLE 1

| $t_{int}$(μs) | $\Delta V(V)$ | Normalized $\frac{I_{PH}}{I_{PH,\max}}$ |
|---|---|---|
| 10 | 1 | 1 |
| 15 | 1 | 0.67 |
| 20 | 1 | 0.5 |
| 25 | 1 | 0.4 |
| 30 | 1 | 0.33 |
| 35 | 1 | 0.28 |
| 40 | 1 | 0.25 |
| 45 | 1 | 0.22 |
| 50 | 1 | 0.2 |
| ... | | |

As shown in TABLE 1, with the above assumptions, the resolution between $I_{PH}$ (normalized) of 1 and 0.5 is small, namely, only 1 sample point. If $\Delta V$ were decreasing (e.g., an increasing $V_{REF}$) in the above calculation, a worse resolution likely would be achieved. Thus, in order to improve the resolution, an increasing then decreasing change (e.g., quadratic) on $\Delta V$ can be utilized to provide improved resolution, such as represented in TABLE 2.

TABLE 2

| $t_{int}$(μs) | $\Delta V(V)$ | Normalized $\frac{I_{PH}}{I_{PH,\max}}$ |
|---|---|---|
| 10 | 1 | 1 |
| 15 | 1.35 | 0.9 |
| 20 | 1.6 | 0.8 |
| 25 | 1.75 | 0.7 |
| 30 | 1.8 | 0.6 |
| 35 | 1.75 | 0.5 |
| 40 | 1.6 | 0.4 |

TABLE 2-continued

| $t_{int}$(μs) | $\Delta V(V)$ | Normalized $\frac{I_{PH}}{I_{PH,\max}}$ |
|---|---|---|
| 45 | 1.35 | 0.3 |
| 50 | 1 | 0.2 |
| ... | | |

The example represented in TABLE 2 assumes that $\Delta V=1.8V$ is available for the integration time being used. Those skilled in the art will appreciate that by employing a $V_{REF}$ that first decreases then increases, the bright end of the wide dynamic range is captured. From a practical perspective, "some" resolutions in this end are also achieved. Here, we say "some" because high resolution generally cannot be achieved in this high light intensity range due to the dynamic range limit of $V_{REF}$. In other light intensity ranges, however, a decreasing (e.g., quadratic) change of $V_{REF}$ would not make much sense. A non-decreasing $V_{REF}$ usually can catch enough resolution in such other intensity ranges.

TABLE 3 illustrates sample data that can be obtained to complete the above example under the same assumptions associated with TABLE 2. For sake of brevity, TABLE 3 assumes that a resolution of 95 points cover the range of $0.01I_{ph,\max}$ to $0.2I_{ph,\max}$, 450 points cover the range of $0.001 I_{ph,\max}$ to $0.01I_{ph,\max}$, 450 points cover the range of $10^{-4} I_{ph,\max}$ to $10^{-3}I_{ph,\max}$, 10 points cover the range of $10^{-5}I_{ph,\max}$ to $10^{-4}I_{ph,\max}$, and 10 points cover the range of $10^{-6}I_{ph,\max}$ to $10^{-5}I_{ph,\max}$. This sampling scheme samples more points in the middle band of the whole dynamic range but fewer point in high and low ends, although it will be understood and appreciated that any number of samples could be utilized for any light intensity range.

TABLE 3

| $t_{int}$ | $\Delta V(V)$ | Normalized $\frac{I_{ph}}{I_{ph,\max}}$ |
|---|---|---|
| 60 μs | 1 | 0.166667 |
| 70 μs | 1 | 0.142857 |
| 80 μs | 1 | 0.125000 |
| 90 μs | 1 | 0.111111 |
| 100 μs | 1 | 0.100000 |
| ... | ... | ... |
| 1000 μs | 1 | 0.010000 |
| 1020 μs | 1 | 0.009804 |
| 1040 μs | 1 | 0.009615 |
| ... | ... | ... |
| 9960 μs | 1 | 0.001004 |
| 9980 μs | 1 | 0.001002 |
| 10000 μs | 1 | 0.001000 |
| 10010 μs | 1-1.9 m | 0.000997 |
| 10020 μs | 1-2 * 1.9 m | 0.000994 |
| ... | ... | ... |
| 14500 μs | 145 m | 0.000100 |
| 15.15 ms | 132.6 m | 0.000090 |
| 15.8 ms | 120.2 m | 0.000080 |
| ... | ... | ... |
| 21 ms | 21 m | 0.000010 |
| 22 ms | 19.8 m | 0.000009 |
| 23 m | 18.4 m | 0.000008 |
| 24 ms | 16.8 m | 0.000007 |
| 25 ms | 15.0 | 0.000006 |
| 26 ms | 13.0 | 0.000005 |
| 27 ms | 10.8 | 0.000004 |
| 28 ms | 8.4 m | 0.000003 |
| 29 ms | 5.8 m | 0.000002 |
| 30 ms | 3.0 m | 0.000001 |
| | | 0 |

Figure 7:
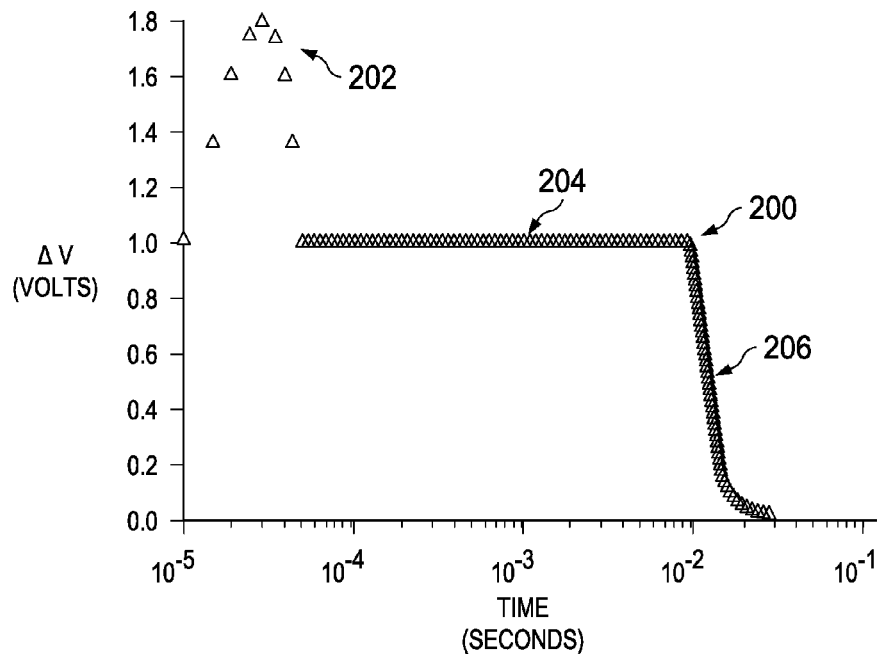
FIG. 7 depicts a graph of delta-V versus time for a non-uniform reference for sampling in accordance with an aspect of the present invention.

FIG. 7 illustrates a plot 200 representing ΔV versus time corresponding to the data of TABLES 2 and 3. Specifically, FIG. 7 depicts a quadratic change of ΔV at very high light intensity range 202, a constant ΔV at a middle light intensity range 204 and a generally monotonically decreasing ΔV at low light intensity range 206.

Figure 8:
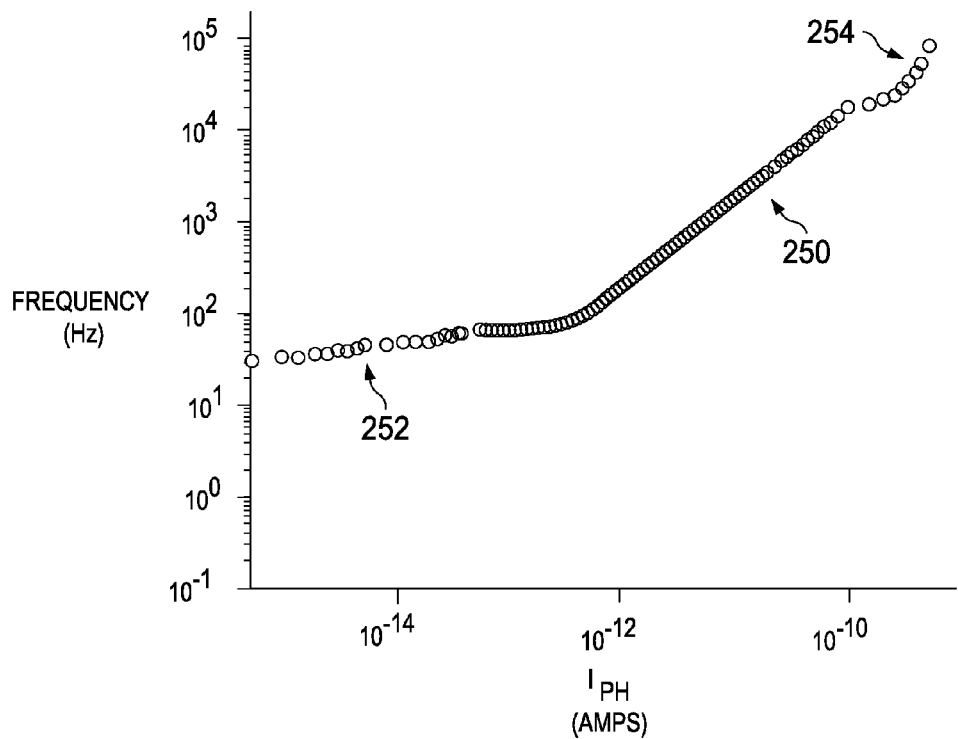
FIG. 8 depicts a graph of frequency versus phase current for a non-uniform reference for sampling in accordance with an aspect of the present invention.

FIG. 8 illustrates a plot 250 the $f_{int}$ versus $I_{PH}$ in the sampling mode utilized in the above example. As depicted in FIG. 8, the dynamic range is compressed in low light intensity range 252. The dynamic range is also partly compressed near the very high light intensity range 254, but it is a quadratic function to satisfy the desired resolution requirement within the minimum integration time interval. Thus, in this example, the dynamic range of $f_{int}$ is about 69.5 dB.

For the example above, there exist many other ways to realize a suitable sampling from 10 μs to 30 ms, as described herein. Those skilled in the art will understand and appreciate that the sampling scheme is application dependent and can be controlled at the imager itself. Therefore, a time domain sampling imager according to an aspect of the present invention is flexible and can be programmable. For example, different numbers of samples can be assigned to each respective range, and the number of ranges further can be varied in accordance with an aspect of the present invention.

In view of the foregoing example, it will be appreciated that, in the high light intensity range, if only a change in the integration time is not enough to catch a reasonable resolution, $V_{REF}$ can be used in conjunction with a change in integration time to achieve such resolution for a desired intensity range. In middle light intensity range, for example, time change usually is enough to catch a reasonable resolution, so $V_{REF}$ can be kept as a constant or it can be monotonically increasing. Finally, in a low intensity range, both time and $V_{REF}$ can be varied to achieve a desired dynamic range and resolution (e.g., $V_{REF}$ will be monotonically increasing).

The above example of the plot 250 further demonstrates that the relationship between $f_{int}$ and $I_{PH}$ is nonlinear. To change to a linear relation, ΔV should be a constant value (see, e.g., Eq. 1). However, ΔV is a linear function of integration time for a given incident light intensity. Thus, a ΔV should be chosen as a reference and other ΔV's can be modified to this reference value by multiplying them by an appropriate response factor. For the 10 bit representation example mentioned above, if the ΔV used for $I_{PH,max}$, denoted by $ΔV_1$, is chosen to be the reference value, then the revised $f_{int}$, denoted by $f_{int}'$ becomes:

$$f'_{int,i} = f_{int,i} \cdot \frac{ΔV_i}{ΔV_1}, (i = 2, 3, 4, \ldots 1024) \quad \text{Eq. 11}$$

Figure 9:
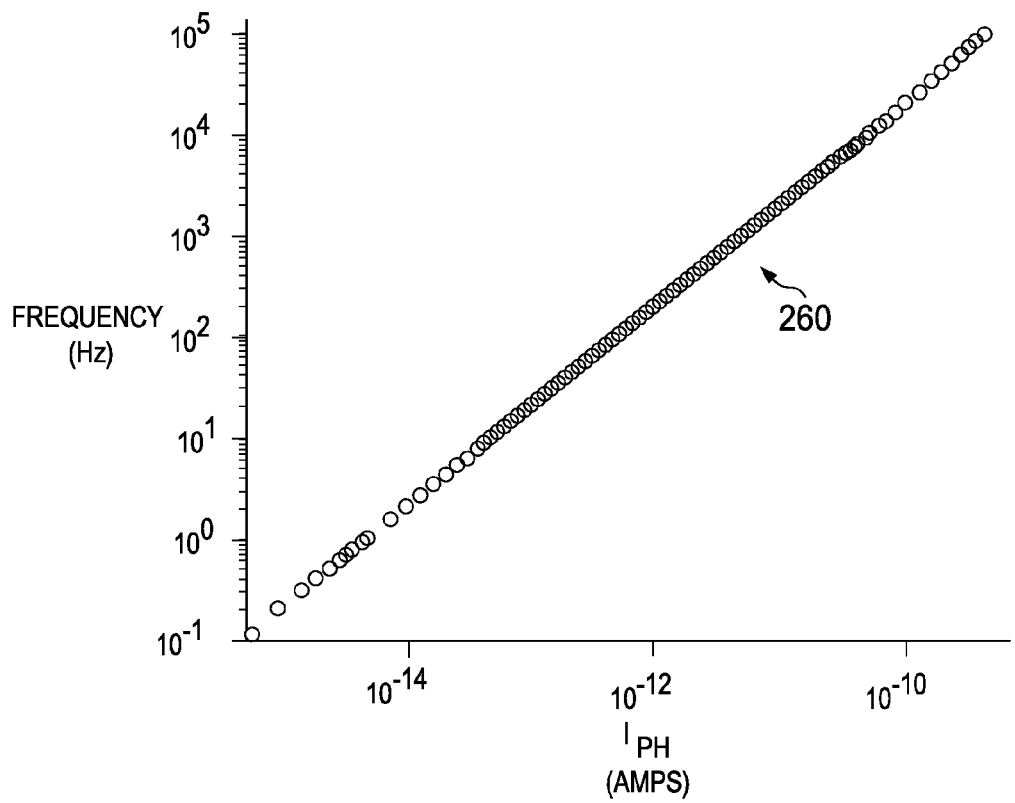
FIG. 9 depicts a graph of frequency versus phase current for a non-uniform reference for reconstruction in accordance with an aspect of the present invention.

FIG. 9 depicts a plot 260 representing $f_{int}'$ versus $I_{PH}$, such as can be used during image reconstruction according to an aspect of the present invention. As shown in FIG. 9, a linear relation is achieved between $f_{int}'$ and $I_{PH}$. Also $f_{int}'$ has a dynamic range of about 120 dB. Thus, the display of $f_{int}'$ is a linear mapping of $I_{PH}$.

Figure 10:
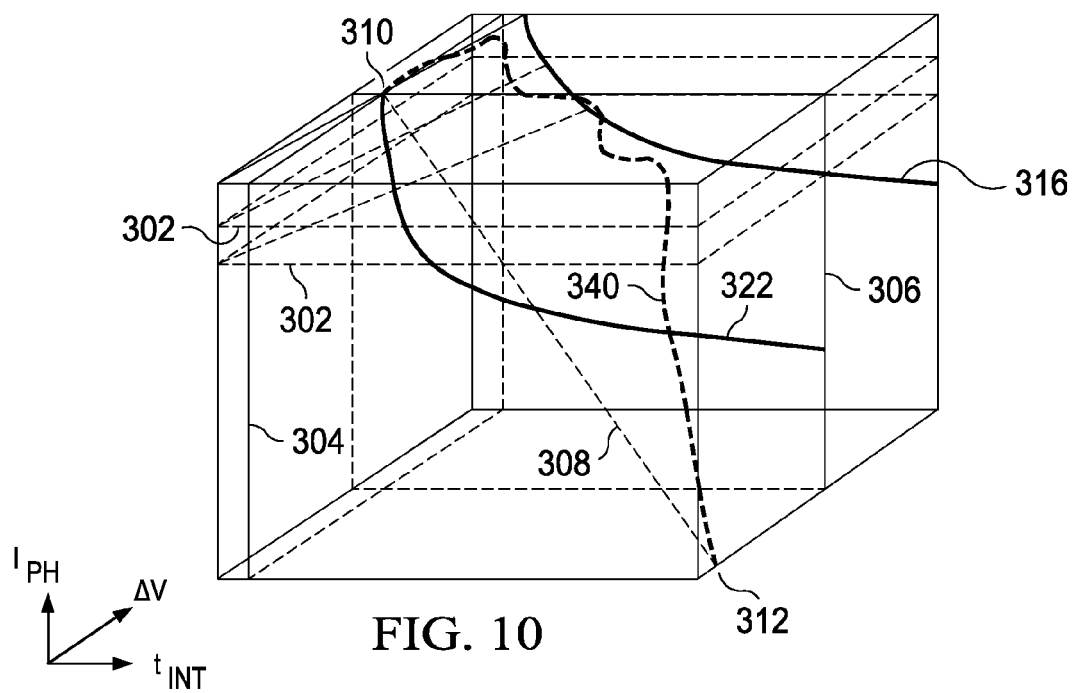
FIG. 10 is a graph in three-dimensional space illustrating a relationship between sampling parameters in accordance with an aspect of the present invention.

FIG. 10 illustrates a graph 300 that depicts relationships between sampling parameters $I_{PH}$, $t_{int}$ and ΔV in three-dimensional space. When implementing sampling in accordance with an aspect of the present invention, a sampling strategy issue becomes how to choose the parameters $I_{PH}$, $t_{int}$, ΔV in the three dimension space for a given application.

In FIG. 10, surfaces, including surfaces 302, that are parallel to the ΔV-$t_{int}$ plane correspond to constant iso-$I_{PH}$ surfaces. Thus, any number of iso-$I_{PH}$ surfaces can exist ranging from $I_{PH,min}$ to $I_{PH,max}$ (e.g., from bottom to top). Similarly, a constant integration time can be represented by planes parallel to the ΔV-$I_{PH}$ plane, including iso-$t_{int}$ surface 304. The iso-$t_{int}$ surfaces can range from $t_{int,1}$ (e.g., about 10 μs) to $t_{int,N}$ (e.g., about 30 ms for video applications) from left to right in the graph 300. The graph also depicts an iso-ΔV surface 306. The iso-ΔV surfaces are parallel to the $I_{PH}$-$t_{int}$ plane for constant values of ΔV ranging from 0 to $V_{res}$.

A line 308 defined by ends at the points of ($I_{PH,max}$, $t_{int1}$, $ΔV_1$) 310 and ($I_{PH,min}$, $t_{int,N}$, $ΔV_N$) 312, located at left-top end and right-bottom end respectively represents a "shortcut" connecting a start and end of a sampling scheme, such as for a single image frame. A line 314 in each iso-$I_{PH}$ surface 302 represents a relationship between ΔV and $t_{int}$. The sampling path, which connects the start and end points 310 and 312, must be composed of the points in the lines 310 representing relationships between ΔV and $t_{int}$.

It will be appreciated that the three sampling parameters $I_{PH}$, $t_{int}$ and ΔV are functionally related to each other and, thus, constrain and are constrained by each other. By way of example, for ease of explanation, assume the photocurrent to be a known value, so that only $t_{int}$ and ΔV remain as variables. Here, N different $I_{PH}$ values are selected, such as according to application requirements. Using Webber's law as a basis for selecting a sampling path, for example, the $k^{th}$ photocurrent that is picked satisfies the following equations:

$$I_{PH,k} = x^{k-1} \cdot I_{PH,max} = x^{k-1} \cdot I_{PH,1} \quad \text{Eq. 12}$$

and $$I_{PH,N} = I_{PH,min} = x^N \cdot I_{PH,max} \quad \text{Eq. 13}$$

where k=2, 3, 4, . . . , N (N being a positive integer indicating the number of $I_{PH}$ values).

As it is known (from Eq. 1) that $$I_{PH} = \frac{C \cdot ΔV}{t_{int}},$$

there exist several different ($t_{int}$, ΔV) pairs for a given $I_{PH}$ (the lines 314 in each iso-$I_{PH}$ surface 302). The task is to select a suitable ($t_{int}$, ΔV) pair from the line 314 representing relationships between ΔV and $t_{int}$ for the given $I_{PH}$ so that it will form a reasonable path from start point to end point together with the other ($t_{int}$, ΔV) pairs that define the sampling path. In total, N pairs of ($t_{int}$, ΔV) are selected according to the N $I_{PH}$'s for a given sampling path. The minimum time interval should be greater than $t_{int,min}$ and ΔV should be constrained to be no greater than $V_{res}$. The locations of these ($t_{int}$, ΔV) pairs in the example of FIG. 10 correspond to the intersections of the ΔV versus $t_{int}$ lines 314 and iso-$t_{int}$ surfaces 302. Those skilled in the art will understand and appreciate that there exist different ways, which may or may not expressly consider Weber's law, to connect the ($t_{int}$, ΔV) pairs with a sampling path, and thus form different sampling paths in accordance with an aspect of the present invention.

For example, a straightforward way to connect the start and end points is the shortcut between them, which is, shown as line 308. However, when applying Webber's law, such a path 308 may not exist. By way of example, assume that $t_{int,1}$ for $I_{PH,max}$ is 10 μs and the minimum time interval is 5 μs.

Assume also that the photodiode voltage drop $\Delta V_1=1$ volt. If $x=90\%$, then from Eqs. 8 and 12, it follows that:

$$\frac{I_{ph,2}}{I_{ph,1}} = \frac{\Delta V_2 \cdot t_{int,1}}{\Delta V_1 \cdot t_{int,2}} = 0.9 \qquad \text{Eq. 14}$$

With $t_{int,2}=(10+5)=15\,\mu s$, Eq. 14 provides that $\Delta V_2=1.35$ volt. But the shortcut path line 308 in FIG. 10 illustrates that $\Delta V$ actually is monotonically decreasing. Thus, the shortcut line 308 does not pass through the line 314 representing relationships between $\Delta V$ and $t_{int}$ in all iso-$I_{PH}$ surfaces. Accordingly, the proposed shortcut path line 308 actually does not exist for the application of Webber's law.

It further is to be appreciated from FIG. 10 that the integration time for one particular photocurrent should be short enough so that the pixels will not saturate (e.g., photocurrent is bounded by a $t_{int,max}$ curve 316. The $t_{int,max}$ curve 316, as depicted in FIG. 10 for a given photocurrent $I_{PH}$, can be represented as follows:

$$t_{int,max} = \frac{C \cdot V_{res}}{I_{PH}}. \qquad \text{Eq. 15}$$

The $t_{int,max}$ curve 316 intersects with iso-$I_{ph}$ surfaces 302. These intersection points correspond to the maximum integration time that can be used for the particular $I_{PH}$'S. As a result, it is desirable to ensure that the sampling time is arranged within the $t_{int,max}$ curve.

By way of further illustration, it can be shown that:

$$\frac{\Delta V_k}{\Delta V_1} = \frac{\Delta V_k}{\Delta V_{brightest\_pixel}} = \frac{I_{ph,k}}{I_{ph,max}} \cdot \frac{t_k}{t_{int,1}} = x^k \cdot \frac{t_k}{t_{int,1}} \qquad \text{Eq. 16}$$

where, $t_k$ is monotonically increasing.

One application of $t_k$ is as follows:

$$t_k = t_{off} + n \cdot \Delta t \qquad \text{Eq. 17}$$

where $t_{off}$ is an offset time,
n is a positive integer corresponding to a sample number, and
$\Delta t$ is the time change step.

Figure 11:
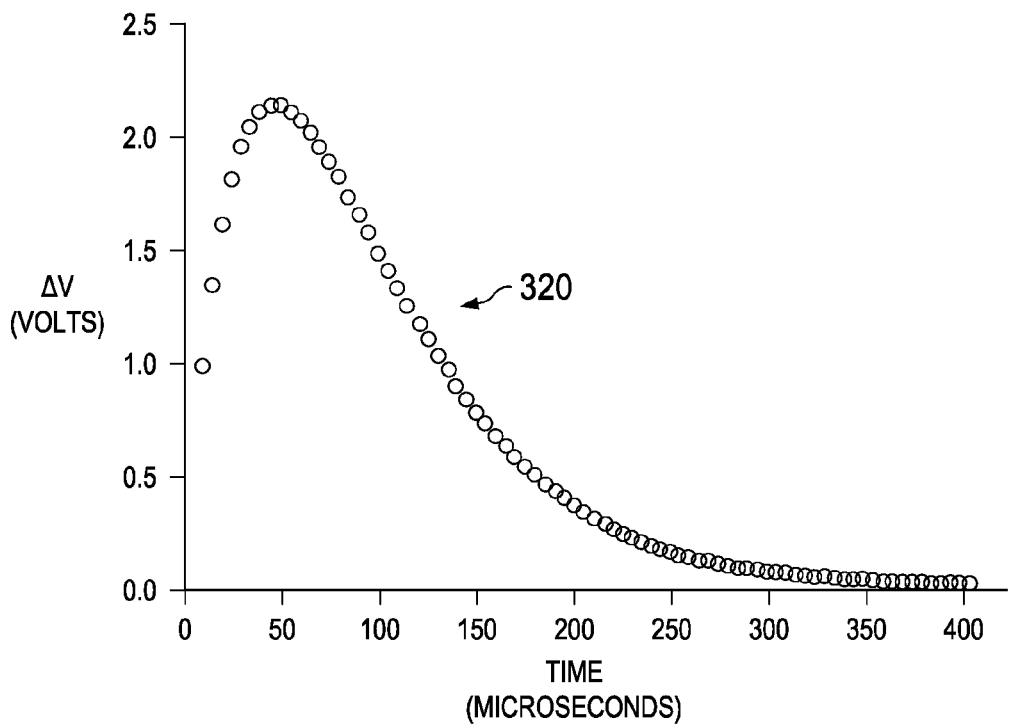
FIG. 11 depicts a graph of delta-V versus time for a non-uniform reference for sampling with a short integration time in accordance with an aspect of the present invention.

Since $x^k$ is exponentially decreasing, and $t_k$ is monotonically increasing, the combination of them will affect the change of $\Delta V$. For example, if x is large and near 1 (e.g., 0.9 or more), then $\Delta V$ may increase for the first few n values because the linear increase of integration time dominates the exponential decrease of photocurrent. As n increases further, $\Delta V$ may go to a downturn because the exponential decrease of photocurrent starts to dominate the linear increase of integration time. An example of a plot 320 of $\Delta V$ versus time, such as according to Eqs. 3 and 4, is shown in FIG. 11. The plot 320 in FIG. 11 corresponds to an example in which $t_{off}=t_{int,1}=10\,\mu s$, $\Delta t=5\,\mu s$, $\Delta V_1=1V$, and $x=0.9$. Those skilled in the art will appreciate that if x is small, the change of $\Delta V$ over time may differ from that shown in FIG. 11. The differences will result because exponential decrease of photocurrent always dominates the linear increase of integration time.

Since $x^k$ drops exponentially over time, $\Delta V$ approaches 0 very quickly for the example of FIG. 11. Consequently, the integration time might be too short to detect the dark light intensity. For example, in FIG. 11, $\Delta V$ approaches 0 at about 400 $\mu s$ (e.g., after about 79 samples). In order to improve resolution for the dark light intensity, it is desirable to delay the arrival of the exponential decrease of $\Delta V$ to 0, such as, for example, until the integration time is approximately 30 ms for video applications. To accomplish this, $\Delta V$ can be maintained at the high value level for a period of time, then it can be permitted to approach 0. For example, $\Delta V$ can be maintained at (or near) a constant value (e.g., about 1V) for a first portion of a sampling cycle.

The relation of $I_{PH}$ versus $t_{int}$ is also shown in FIG. 10 as the curve 322. In order to maintain $\Delta V$ at the high value level, the time change step $\Delta t$ can be increased to compensate for the decrease in $\Delta V$ caused by $x^k$. The $\Delta V$ thus is determined as a function of the selected total sampling time (e.g., maximum integration time) and the known $I_{PH}$.

Figure 12:
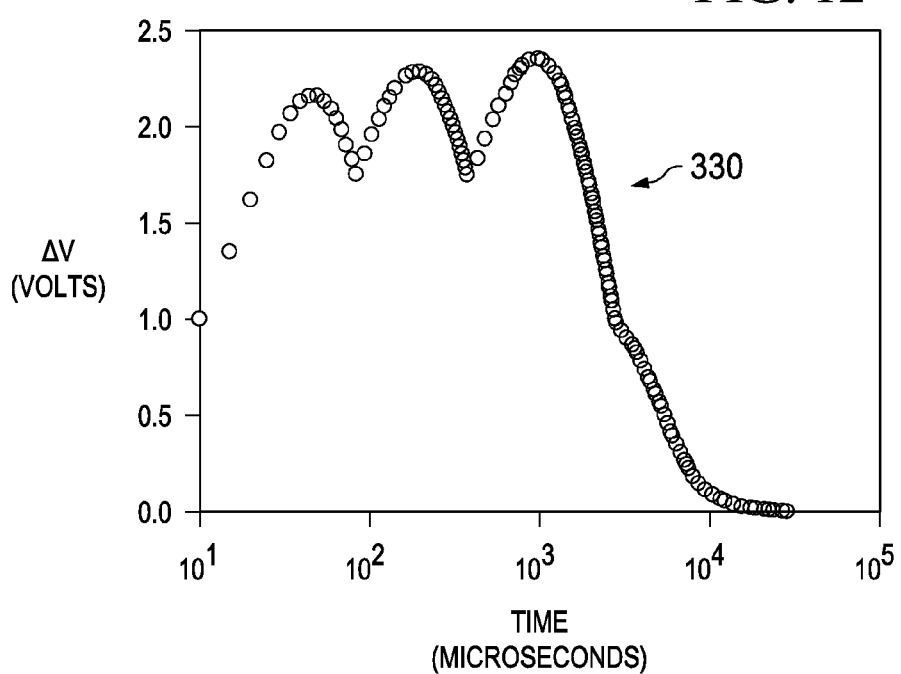
FIG. 12 depicts a graph of delta-V versus time for a non-uniform reference for sampling with a short integration time in accordance with an aspect of the present invention.
Figure 13:
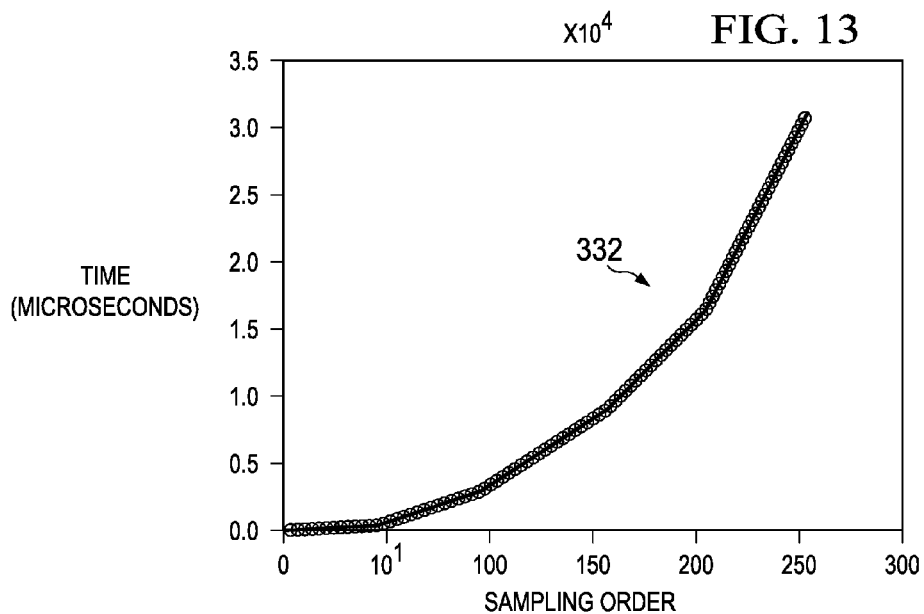
FIG. 13 is an example of time versus sampling order associated with the graph of FIG. 12.

FIG. 12 illustrates a plot 330 for an example of one possible set of $\Delta V$ values versus sampling time that can be implemented in accordance with an aspect of the present invention. A first portion of the plot 330 includes plural sets of increasing and then decreasing $\Delta V$ values prior to decreasing to near zero at a latter portion of the sampling cycle. FIG. 13 illustrates another plot 332 of time (in microseconds) versus sampling order for 256 sampling times, such as can be associated with the curve 330 of FIG. 12. The sampling path associated with this sampling scheme is illustrated in FIG. 10 by a thick dashed curve 340. It will be appreciated by those skilled in the art that the sampling path 340 represents one possible sampling path and that many different solutions exist depending on a given application. It further will be appreciated that there are other ways to quantize photocurrent from that shown in FIG. 10, which generally will also be application dependent.

In summary, as long as a set of $I_{PH}$ is determined, e.g., according to Webber's law, the $\Delta V$ versus $t_{int}$ for each particular $I_{PH}$ is fixed. In FIG. 10, the relationship between $\Delta V$ and time is represented by the lines 314 in each iso-$I_{PH}$ surface. Then, N (e.g. 256) samples should be selected in the time axis. Because the highest and lowest light intensities are known, the start point ($I_{PH,max}$, $t_{int,1}$, $\Delta V_1$) and end point ($I_{PH,min}$, $t_{int,N}$, $\Delta V_N$) are fixed (see FIG. 10). Those points where the $\Delta V$ versus $t_{int}$ lines intersect the selected N sample time surfaces define a path from the start point to the end point. There exist many ways to form (or approximate) the path following the above parameter selection criteria, in which the sampling time interval is greater than the $\Delta t_{int,min}$, and $0 < \Delta V < V_{res}$.

Figure 14:
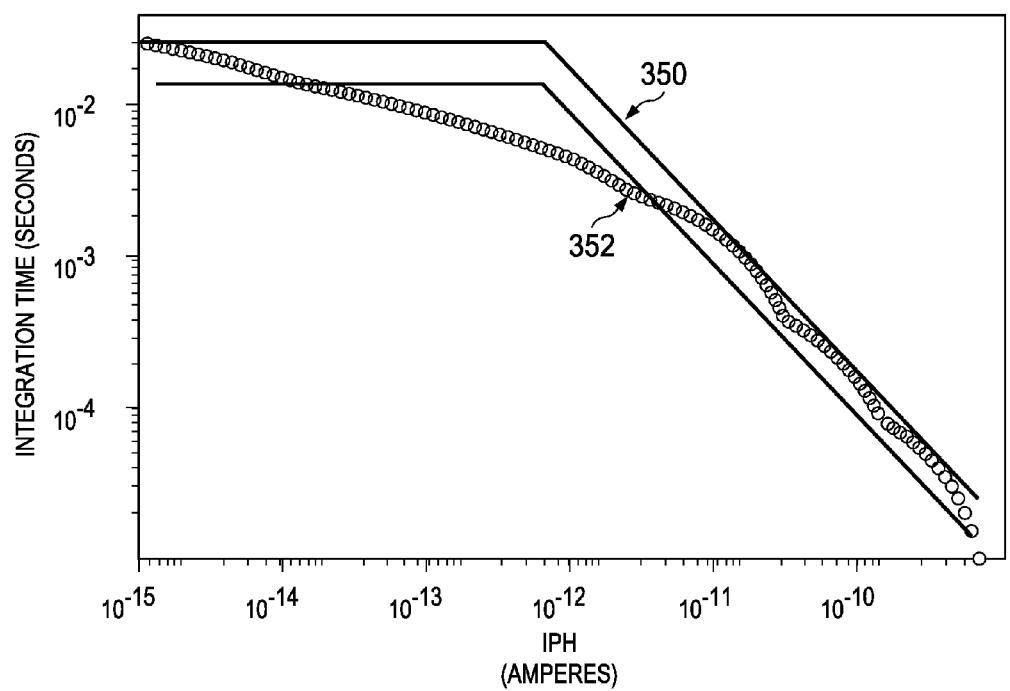
FIG. 14 is an example of a graph of integration time versus photocurrent illustrating part of a method that can be used to derive sampling parameters in accordance with an aspect of the present invention.

By way of further example, the first step in determining a desirable sampling pattern is to select a set of $I_{PH}$ according to a particular application. As mentioned above, for each selected $I_{PH}$, there exist maximum integration time limit to avoid pixel saturation. FIG. 14 illustrates a logarithmic graph for a situation where the available maximum integration time for the whole image is about 30 ms. In FIG. 14, for example, a maximum integration time for a particular $I_{PH}$, indicated by plot 350, provides the boundary of integration time. The plot 350 in FIG. 14 thus can be considered as a projection of the $t_{int,max}$ curve 314 on to the $I_{PH}$-$t_{int}$ coordinates of FIG. 10.

After the maximum integration time has been established for the selected $I_{PH}$, the second step is to select an integration time for each selected $I_{PH}$ within the integration time boundary. Thus, a set of sampling time instance should be available by this step, such as depicted as curve 352 in FIG. 14. The curve 352 corresponds to the example of a Webber's law application, such as described herein.

Figure 15:
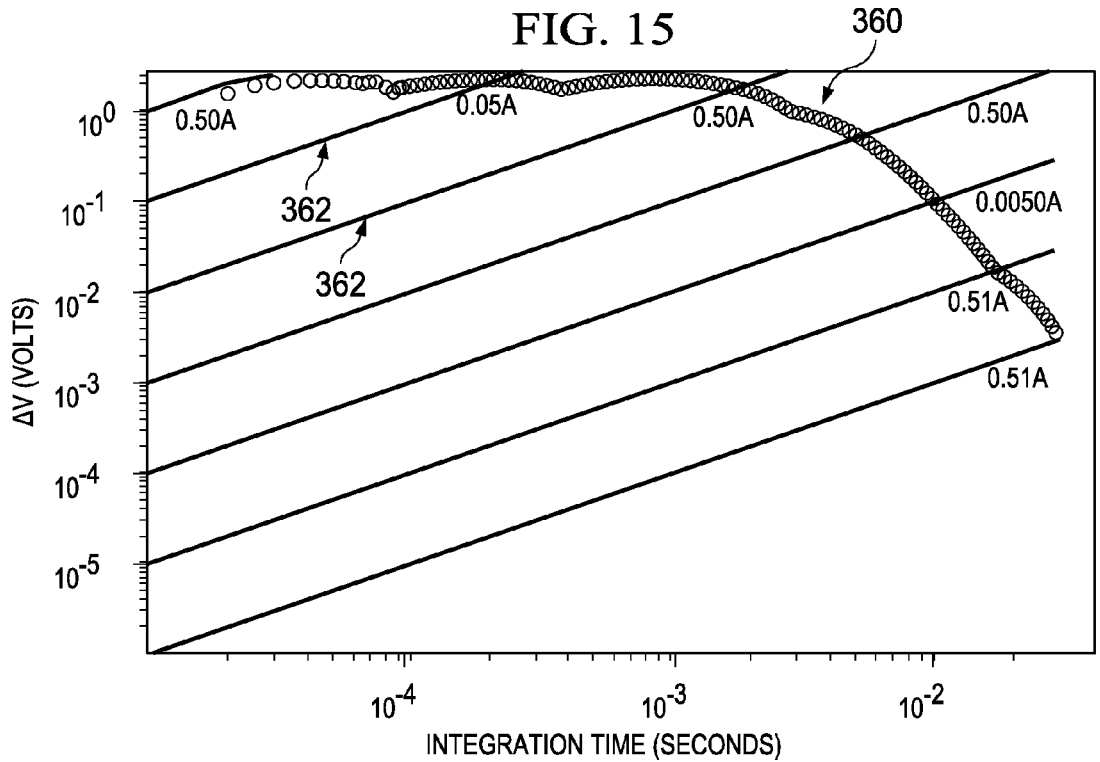
FIG. 15 is an example of a graph of delta-V versus integration time illustrating another part of a method that can be used to derive sampling parameters in accordance with an aspect of the present invention.

FIG. 15 illustrates a plot 360 of $\Delta V$ versus $t_{int}$, such as can be employed to determine $\Delta V$ (after completing steps one and two) according to an aspect of the present invention. In particular, ΔV can be associated with the ($I_{PH}$, $t_{int}$) pairs. If the ΔV value exceeds $V_{res}$, however, it may be necessary to reselect $t_{int}$, such as by making it smaller (e.g., according to Eq. 15). In FIG. 15, the lines 362 represent the ΔV change with time for different $I_{PH}$ values (e.g., corresponding to 314 in FIG. 10). As a result, the selected pair of ($I_{PH}$, $t_{int}$) from FIG. 14 will uniquely decide a ΔV value. Thus, it is to be appreciated that graphs similar to those shown in FIGS. 14 and 15 can be utilized to find a reasonable ($I_{PH}$, $t_{int}$, ΔV) path for imaging in accordance with an aspect of the present invention.

Figure 16:
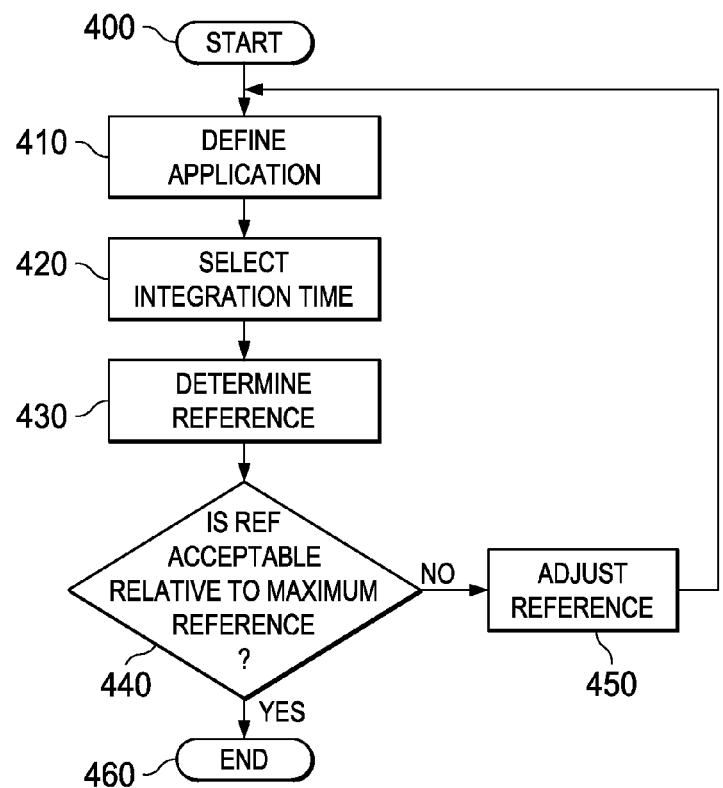
FIG. 16 is a flow diagram illustrating a methodology that can be used to derive sampling parameters in accordance with an aspect of the present invention.
Figure 17:
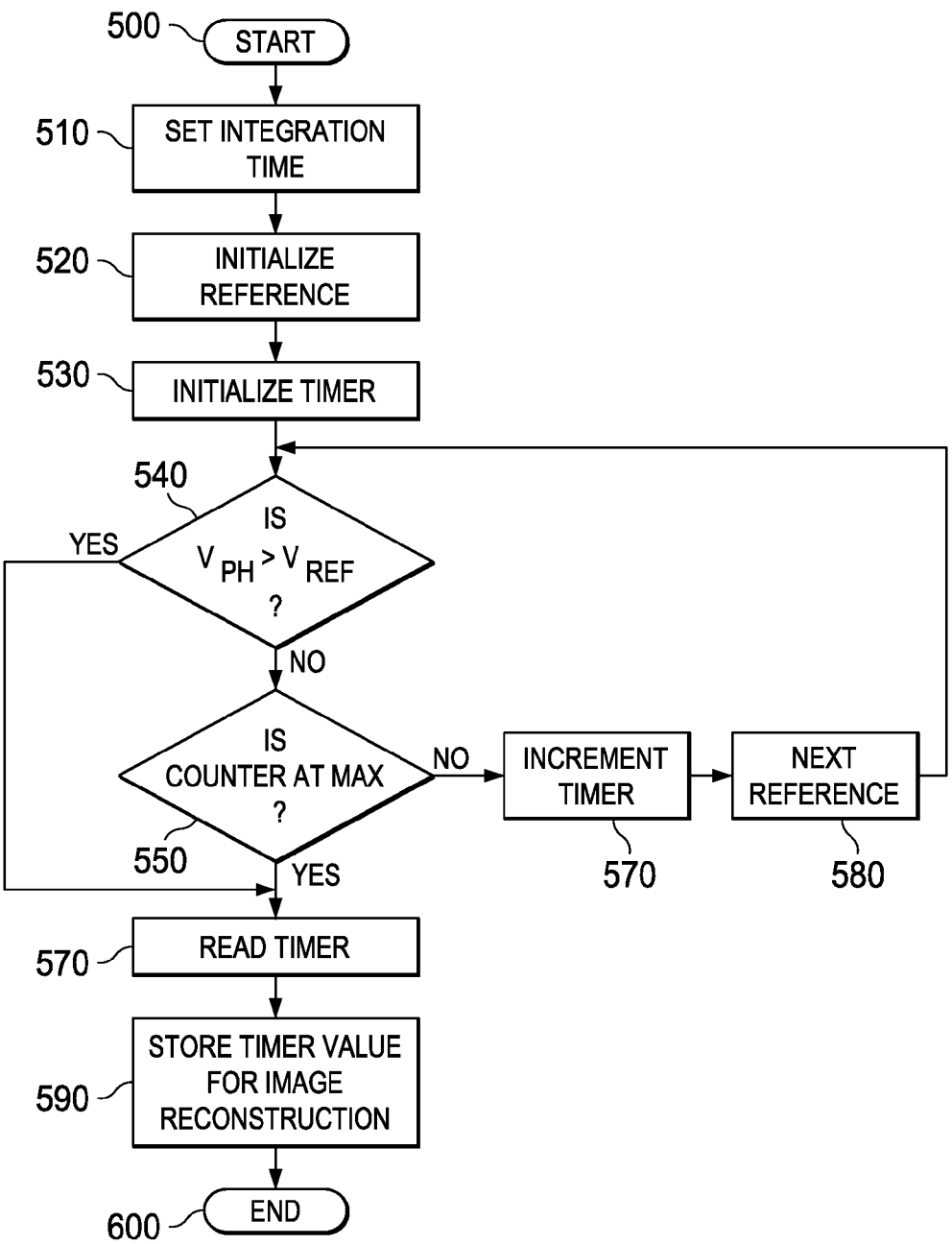
FIG. 17 is a flow diagram illustrating a methodology for time domain sampling for imaging in accordance with an aspect of the present invention.

In view of the examples shown and described above, methodologies that may be implemented in accordance with the present invention will be better appreciated with reference to the flow diagrams of FIGS. 16 and 17. While, for purposes of simplicity of explanation, the methodologies are shown and described as a executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. It is further to be appreciated that the methodologies or one or more aspects thereof could be implemented as hardware, software, or as a combination of hardware and software, such as part of one or more integrated circuits configured to implement such methodologies.

FIG. 16 illustrates a methodology for selecting a sampling pattern in accordance with an aspect of the present invention. The methodology begins at 400, which can occur upon activating or powering up a system to implement the methodology. Such initializations can include, for example, configuring systems, clearing buffers, allocating memory, acquiring resources, and setting initial values for variables.

At 410, a given application is defined for which an image is to be captured. This can include, for example, establishing desired photodiode current characteristics or otherwise identifying desired resolutions, such as for different intensity ranges of light.

Once the application parameters have been defined, which may include establishing a range of photodiode current, the methodology proceeds to 420. At 420 an integration time is selected. The integration time corresponds to a sampling cycle interval during which a plurality of samples can be taken. For standard imaging the integration time may be variable from microseconds to milliseconds or more. For a video application, a maximum integration time typically is about 33 milliseconds. With the application defined, an integration time can be associated with each photocurrent to help establish a sampling path to provide a desired resolution.

Next, at 430 at reference is determined, such as a function of the integration time and the defined application. The reference can be a reference voltage that is used relative to a photodiode voltage to ascertain whether a given pixel sensor has fired. The reference can be fixed or variable (non-uniform) as a function of time in accordance with an aspect of the present invention. For example, where the application is defined to capture an image having a wide dynamic range, the reference can vary differently for different light intensity ranges.

By way of further example, in a situation where incident light causes a photodiode voltage to decrease, for high intensity light, the reference can be nonlinear. One possible implementation would be to cause the reference to first decrease and then increase to improve the resolution for very high intensity light. The reference voltage for this light range can be implemented as a quadratic functional form, although other types of curves or functional forms could be utilized to capture a desired resolution in that intensity range. For medium intensity light, the reference can be fixed or otherwise be caused to approach (e.g., increase for discharging type of photodiode) a decreasing photodiode voltage. For low intensity light in this example, the reference voltage further can be increased, although more slowly, during the remaining portion of the sampling interval to improve resolution for low intensity light.

After the reference has been determined at 430 the methodology proceeds to 440 to determine whether the reference is at an acceptable value relative to a maximum reference. A maximum reference, for example, corresponds to a reset voltage for an associated photodiode. The reset voltage could have a high or low value depending on whether the photodiode charges or discharges in response to incident light. If the determination at 440 is negative, indicating that the reference is not an acceptable level relative to the maximum reference, the methodology proceeds to 450. At 450, the integration time is adjusted, such as according to Eq. 15.

If the determination at 440 indicates that the reference determined at 430 is acceptable relative to the maximum (or minimum) reference, the methodology can end at 460. It further is to be appreciated that a user can manually (or programmatically) adjust the imager parameters, in any suitable way, such as to achieve a desired visual effect associated with the image being captured.

FIG. 17 illustrates a methodology for a time domain sampling for a CMOS imager in accordance with an aspect of the present invention. While a single sampling cycle for a single pixel is described with respect to FIG. 17, those skilled in the art will understand and appreciate that the methodology can be repeated, such as for video imaging, and typically is implemented with respect to some or all of the available CMOS pixel sensors.

The methodology begins at 500 such as in connection with activating or powering up an imaging system implementing the methodology. At 510, an integration time is set. The integration time can be set such as described with respect to 420 of FIG. 16. It is to be further appreciated that the integration time can be set in other manners and can be an arbitrary user-programmable parameter in an imaging system implementing the methodology. For other applications, the integration time (or its maximum value) can be predetermined, such as for video applications.

At 520 the reference associated with the integration time is initialized. For example, the reference, which may be a reference voltage or current, provides a reference for comparing the photodiode voltage or current at a plurality of samples that are obtained during the integration time. At 530, a timer is initialized. The timer, for example corresponds to a time index value that varies from a minimum count value to a maximum count value associated with a number of image samples to be taken during a sampling cycle. The sampling cycle corresponds to samples obtained over the integration time and a desired resolution for the imaging process.

In the following example, assume that a photodiode discharges in response to receiving incident light so as to cause a decrease in a photodiode voltage based on the incident light. As a result, the reference used in this example also is described for accommodating such a photodiode. However, it is to be understood and appreciated that the reference also can be utilized to accommodate a photodiode that charges and thereby causes and increase in photodiode voltage in response to receiving incident light.

At 540, with the image capture process underway, a determination is made as to whether the photodiode voltage is greater than a reference voltage. The comparison at 540 provides an indication as to whether a pixel defined by the photodiode has fired or not. If the determination at 540 is negative, indicating that the photodiode voltage is not greater than the reference voltage, the methodology proceeds to 550.

At 550, a determination is made as to whether the timer is at a maximum time value. If the timer is not at a maximum time value, indicating that additional sampling still can be performed for the present sampling cycle, the methodology proceeds to 560. At 560, the timer is incremented to its next value. Thus it is to be appreciated that the photodiode voltage is compared to the reference voltage for each timer value (e.g., a time index value). At 570, the reference also is incremented to a next reference value, which can be the same or a different reference value. For example, in a high light intensity range, the reference voltage can be non-uniform so as to initially decrease and then increase. Then, for a next part of the sampling cycle, such as associated with a medium intensity range, the reference could be fixed or increase. The reference further could be controlled to further increase over a latter portion of the sampling so as improve resolution for low intensity light. The next reference value can be obtained, for example, from a look up table or it can be determined algorithmically from one or more equations that define the references based on the timer value. From 570 the methodology returns to 540 to complete a comparison between the photodiode voltage and the new reference voltage.

If, at 540, the photodiode voltage exceeds the reference voltage, the methodology proceeds to 580. At 580, a timer value is read in response to the photodiode voltage exceeding the reference voltage. The timer value can correspond to a time index value associated with the pixel that fires. Alternatively, the timer value can be an absolute time or relative time generated during each sampling cycle. From 580 the methodology proceeds to 590.

If the determination at 550 is positive indicating that the timer has reached the maximum time value, the methodology proceeds to 590. At 590 the timer value read at 560 during the sampling cycle can be stored for subsequent image reconstruction. In particular, the timer value that is read at 580 can be associated with a given $V_{REF}$ and associated with a respective pixel to facilitate image reconstruction in accordance with an aspect of the present invention. From 590 the methodology proceeds to 600 and ends.

In view of the foregoing system description, those skilled in the art will understand and appreciate that multitudinous different sampling patterns can utilized based on a two-freedom time domain sampling scheme in accordance with an aspect of the present invention. It further will be appreciated this two-freedom approach is very flexible and programmable so as to accommodate virtually any imaging application. For example, in an imaging product implementing the two-freedom sampling approach, a set of sampling patterns can be preprogrammed in the system and selected by users according to the will-be-captured environment. Additionally, versatility can be added by enabling the integration time, the reference voltage or both to be programmable by the user in such imaging devices, which can provide user-customized sampling patterns. Because a CMOS imager implemented in accordance with an aspect of the present invention can be fabricated as an integrated circuit more easily and usually less expensively than its CCD counterpart, it becomes more desirable to employ the CMOS imager in numerous applications, such as, for example, on-chip cameras, PC (or web) cameras, cell phone and PDA imaging systems, toys and games and other electronic devices in which a digital camera might be utilized.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A solid state time domain image system comprising:
a pixel array having a plurality of CMOS pixel sensors responsive to light, each pixel sensor having a value functionally related to incident light received thereby, wherein at least one of the plurality of CMOS pixel sensors comprising a photodiode coupled to provide an indication of a photodiode voltage to an associated comparator, the comparator comparing the photodiode voltage relative to a reference voltage corresponding to the reference, the comparator provides a state signal that indicates when the photodiode voltage has the predefined condition relative to the reference voltage;
a detection system that compares the value of at least some of the pixel sensors relative to a reference during a sampling period defined by an integration time parameter and associates a time value with when the value has a predefined condition relative to the reference, the integration time parameter and the reference being variable during sampling in the time domain; and
a memory device that stores an indication of time associated with when the photodiode voltage has the predefined condition relative to the reference voltage, the indication of time being stored at a memory location associated with the at least one pixel sensor and the reference voltage that enabled the comparator to provide the state signal.

2. The system of claim 1, further comprising a reference generator that generates the reference to achieve a desired dynamic range during the sampling period defined by the integration time.

3. The system of claim 2, the reference generator dynamically varying the reference as a non-linear function of time during sampling.

4. The system of claim 3, the reference generator controlling the reference to be non-uniform over the sampling period.

5. The system of claim 2, the reference generator controlling the reference to monotonically approach a reset value of the pixel sensor during at least a portion of the sampling period.

6. The system of claim 2, the reference generator controlling the reference to cause a difference between the reference and the reset value to increase during at least a first portion of the sampling period to enable improved resolution for a high intensity light range.

7. The system of claim 6, the reference generator controlling the reference to monotonically approach the reset value during at least a second portion of the sampling period that occurs after the first portion of the sampling period.

8. The system of claim 6, the value of the pixel sensor defining a pixel voltage that changes as a function of an intensity of the incident light, the reference generator generating the reference as a reference voltage that changes during the first portion of the sampling period to approach a reset voltage defined by the reset value, and then decreases the difference between reference voltage and the reset voltage during at least a second portion of the sampling period that occurs after the first portion of the sampling period.

9. The system of claim 8, the reference generator generating one of (i) the reference voltage as a constant reference voltage and (ii) the reference voltage to monotonically approach the reset voltage during a third portion of the sampling period that occurs between the first and second portions of the sampling period.

10. The system of claim 1, the integration time parameter being programmable.

11. The system of claim 10, the reference being a programmable parameter that varies as a function of the integration time parameter to define a non-uniform sampling pattern.

12. An imager comprising:
a pixel array having a plurality of CMOS pixel sensors responsive to light, each pixel sensor having a value functionally related to an intensity of incident light received thereby, wherein at least one of the plurality of CMOS pixel sensors comprising a photodiode coupled to provide an indication of a photodiode voltage to an associated comparator, the comparator comparing the photodiode voltage relative to a reference voltage defined by the reference, the comparator provides a state signal that indicates when the photodiode voltage has the predefined condition relative to the reference voltage;
a reference generator that generates a reference value as a function of an integration time parameter to define a non-uniform sampling pattern over an sampling period;
a detection system that monitors the values of the pixel sensors and receives the reference value, the detection system being operative to associate a time value with each pixel sensor based on the value of the respective pixel sensor having a predefined condition relative to the reference value, the integration time parameter and the reference value being programmable parameters; and
a memory device that stores an indication of time associated with when the comparator provides the state signal, the indication of time being stored at a memory location associated with the at least one pixel sensor and with the reference voltage that caused the comparator to provide the state signal.

13. The system of claim 12, the reference generator controlling the reference value to monotonically approach a reset value associated with the respective pixel sensor during at least a portion of the sampling period.

14. The system of claim 12, the reference generator generating the reference value such that a difference between the reference value and the reset value increases during at least a first portion of the sampling period to enable improved resolution for a high intensity light range.

15. The system of claim 14, the reference generator controlling the reference to monotonically approach the reset value during at least a second portion of the sampling period subsequent to the first portion of the sampling period.

16. The system of claim 14, the value of the pixel sensor defining a voltage that decreases as a function of the intensity of the incident light, the reference generator generating the reference as a reference voltage that provides an increase in the difference between the reference voltage and a reset voltage during the first portion of sampling period and then causes the reference voltage to approach the reset voltage during at least a second portion of the sampling period.

17. The system of claim 16, the reference generator generating one of (i) the reference voltage as a constant reference voltage and (ii) the reference voltage as a monotonically changing reference voltage that approaches the reset voltage during a third portion of the sampling period that occurs between the first and second portions of the sampling period.

18. The system of claim 12, further comprising a table populated with a plurality of available sampling pattern sets, the reference generator aggregating at least some of the sampling pattern sets from the reference table to provide the sampling pattern.

* * * * *